United States Patent [19]

Inumaru et al.

[11] Patent Number: 5,627,911
[45] Date of Patent: May 6, 1997

[54] FIGURE INSPECTION METHOD AND APPARATUS

[75] Inventors: Yoshikazu Inumaru, Tokyo; Kazuyuki Imamura, Kanagawa, both of Japan

[73] Assignee: Sony Corporation, Japan

[21] Appl. No.: 300,219

[22] Filed: Sep. 6, 1994

[30] Foreign Application Priority Data

Sep. 10, 1993 [JP] Japan .................................. 5-225719
Nov. 26, 1993 [JP] Japan .................................. 5-296800

[51] Int. Cl.⁶ .................................................. G06K 9/00
[52] U.S. Cl. ........................................ 382/141; 348/86
[58] Field of Search .................................. 382/141, 142, 382/143, 152, 154, 284; 348/86, 88, 89, 127

[56] References Cited

U.S. PATENT DOCUMENTS

| | | | |
|---|---|---|---|
| 4,272,756 | 6/1981 | Kakumoto et al. | 340/146.3 |
| 5,214,713 | 5/1993 | Juvinall | 382/142 |
| 5,305,391 | 4/1994 | Gomibuchi | 382/142 |
| 5,392,359 | 2/1995 | Futamura et al. | 382/141 |
| 5,408,104 | 4/1995 | Gorria et al. | 382/141 |
| 5,410,353 | 4/1995 | Cerda | 382/141 |

FOREIGN PATENT DOCUMENTS 3133432  8/1991  Japan .

OTHER PUBLICATIONS

Fant, E.W., et al., "Automated Print Inspection for Cylindrical Surfaces", Int. J. Prod. Res., 1994, vol. 32, No. 8, 1811–1817.

Nakamura, Y., et al., "Development of a High Performance Stamped Character Reader", IECON '84, 1011–1014.

Bartz, M. R., et al., "Laser Scanner for OCR with Single Line or Entire Page Capabilities", IBM Technical Disclosure Bulletin, vol. 13, No. 2, Jul. 1970.

*Primary Examiner*—Yon J. Couso
*Attorney, Agent, or Firm*—Ronald P. Kananen

[57] ABSTRACT

An article under inspection is rotated at pre-set angular increments which total more than 360°, to divide the figure inscribed on the curved surface of the article into plural fractions. Selected picture fractions which discard redundant overlapping picture data, is synthesized into picture information indicative of one full-format picture based on which the figure inscribed on the curved surface of the article. Acceptability is determined automatically and quantitatively as compared to the conventional functional inspection and is performed without regard to the difference in skill from one operator to another. Recognizing the characters or symbols inscribed on the curved surface of the article under inspection one by one based on the information of the synthesized full-format picture, allows a comparison of the character string consisting of the recognized characters or symbols to a pre-set control character string.

9 Claims, 22 Drawing Sheets

* MACHINE TYPE SETTING *

216(ECX) SERIES
SELECT FROM THE FOLLOWING

| UPPER | LOWER |
|---|---|
| F6.3/250V | LF |
| F6.3AH250V | NONE |
| F8A/250V | LF |
| F10AH250V | NONE |

36d₁₁, 36d₁₂, 36d₁₃, 36d₁₄

UPPER  LOWER

MENU — 39a
PREVIOUS PAGE — 39b

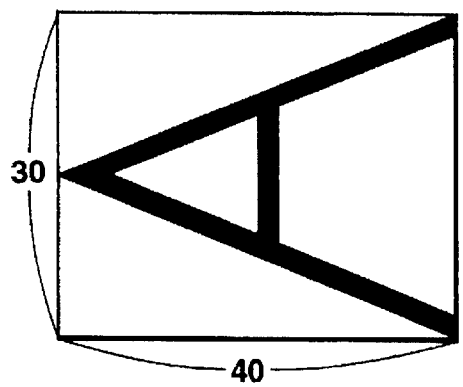
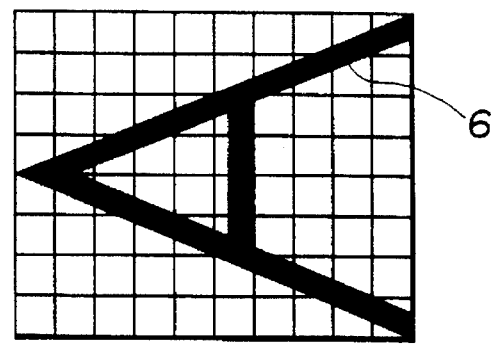
FIG. 16(a)     FIG. 16(b)
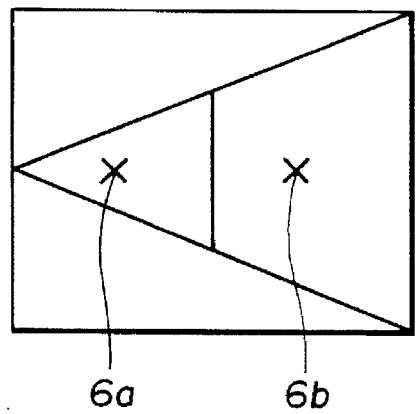
FIG.17
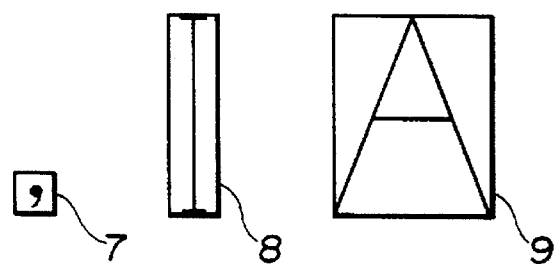
FIG.18

FIGURE INSPECTION METHOD AND APPARATUS

BACKGROUND OF THE INVENTION

This invention relates to a method and apparatus for inspecting a figure. More particularly, it relates to a method and apparatus for inspecting a figure inscribed on a curved surface, for example, a letter or character inscribed on a mouthpiece of a glass tube fuse.

The figure drawn on a curved surface, for example, an inscription on the curved surface of the mouthpiece of the glass tube fuse, is difficult to inspect automatically, and hence is inspected visually by an operator. Thus, the characters inscribed on the outer periphery of the mouthpiece, such as rated current values or withstand voltages, or symbols, such as UL or CSA standard marks or type A marks for electrical components, are visually inspected, as the glass tube fuse is manually rotated about its axes.

Such manual inspection suffers from the problems that the inspection is in need of skill and is susceptible to fluctuations in the results. In addition, since the inscriptions are difficult to view precisely, the inspector's eyes become fatigued. Further, the inspection is a monotonous and physically hard operation. In other words, the inspection imposes increased cost in manpower inclusive of the cost of pedagogy and training.

On the other hand, the glass tube fuse is an electrical component which is used in large quantities in the field of consumer equipment and which is critical from the viewpoint of safety standards. In order to acquire recognition of the so-called ISO 9000 series, the debut of a suitable inspection device which takes the place of visual inspection has been strongly desired.

SUMMARY OF THE INVENTION

In view of the above-described status of the art, it is an object of the present invention to provide a method and apparatus for figure inspection whereby a figure drawn on an article to be inspected, such as inscriptions on a glass tube fuse, may be automatically inspected for avoiding fluctuations in the test results.

In one aspect, the present invention provides a method for inspecting a figure comprising rotating an article under inspection having a curved surface at an interval of a pre-set angle of rotation for dividing the figure inscribed on the curved surface of the article under inspection into plural picture fractions, fetching and synthesizing the picture information from the plural directions, and inspecting the figure inscribed on the curved surface of the article under inspection based on the synthesized picture information.

The article under inspection may be sorted based on the results of inspection of the figure.

The article under inspection may be rotated through (360°+pre-set angle) and plural picture fractions may be synthesized into one full format picture in which one of overlapping fractional pictures is discarded.

The figure may be made up of characters or symbols recognized one by one, and a character string made up of the recognized characters or symbols may be compared to a pre-set control character string by way of performing figure inspection.

In its another aspect, the present invention provides an apparatus for inspecting a figure comprising means for rotating an article under inspection having a curved surface at an interval of a pre-set angle of rotation, imaging means for imaging the figure inscribed on the curved surface of the article for each pre-set angle of rotation for outputting the picture information data from plural directions, means for synthesizing the plural picture information data from said imaging means, and means for inspecting the figure inscribed on the curved surface of the article based upon the picture information synthesized by the synthesizing means.

The apparatus may further comprise a setting jig for holding the article and rotating the article to the imaging means, and sorting means for receiving the inspected article from the setting jig and sorting the article based on an inspection output of the inspection means.

The article under inspection may be rotated by said rotating means through (360°+pre-set angle) and plural fractional pictures may be synthesized into one full format picture in which one of overlapping fractional pictures is discarded.

The figure may be made up of characters or symbols, and the inspection means may comprise character recognition means for recognizing the characters or symbols one by one and character string inspecting means for comparing a character string of characters or symbols recognized by the character recognition means to a pre-set control character string by way of performing figure inspection.

There may also be provided an annular light for lighting the article under inspection being imaged by the imaging means.

BRIEF DESCRIPTION OF THE DRAWINGS

FIG. 8 illustrates still another display example on the operating mode during the machine type setting mode.

FIGS. 16A and 16B illustrate pattern matching analysis employed during letter matching.

FIG. 17 illustrates analysis by the number of hole and the position of the center of gravity during letter matching.

FIG. 18 illustrates letter recognition by the circumscribed rectangle during letter matching.

DESCRIPTION OF PREFERRED EMBODIMENTS

Figure 1:
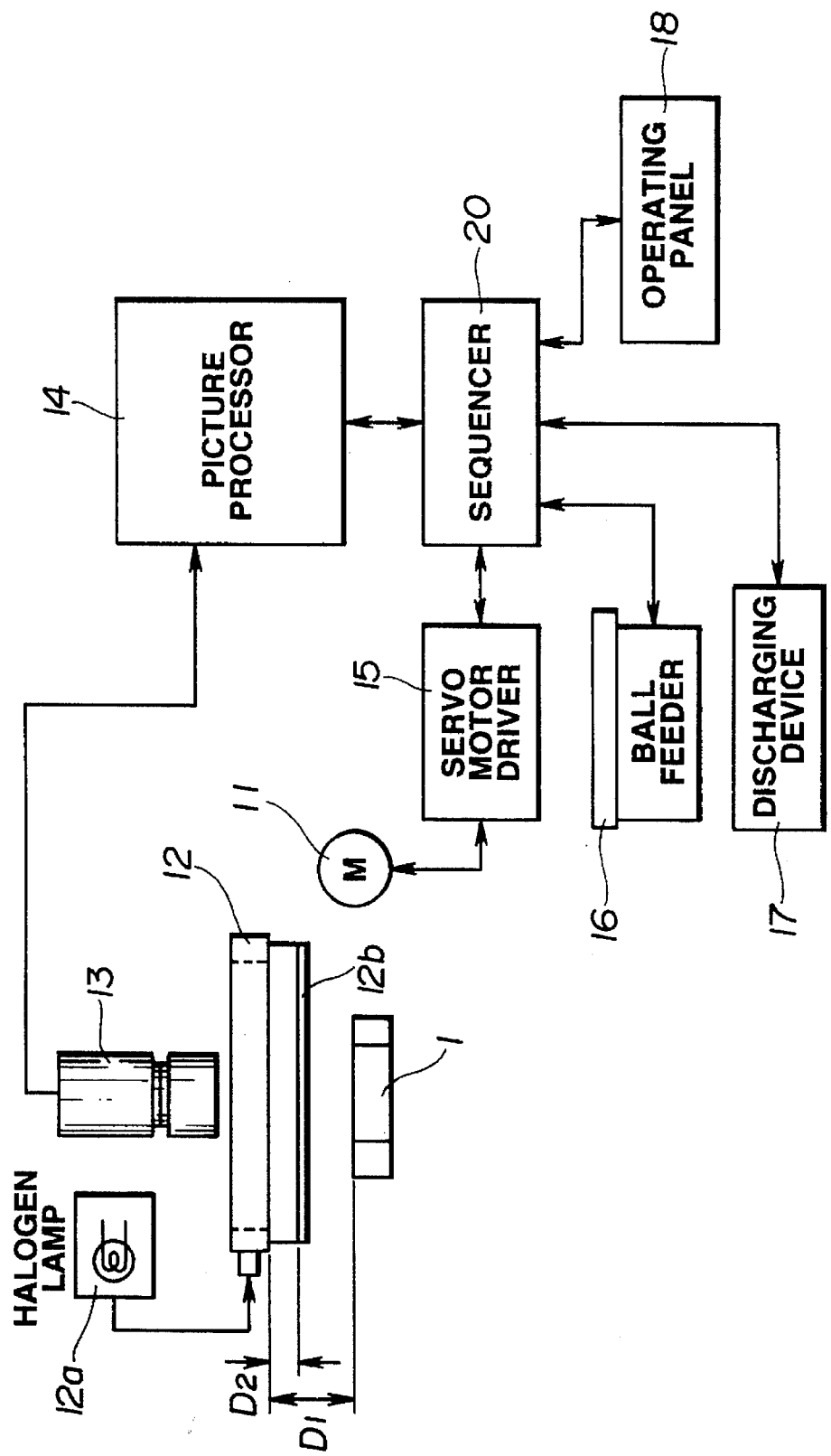
FIG. 1 is a block diagram showing a concrete constitution of a figure inspection device according to the present invention.

Referring to the drawings, preferred embodiments of the figure inspection method and apparatus according to the present invention will be explained in detail.

Referring first to FIG. 1, the figure inspection device according to the present invention includes an electric motor 11 for rotating each article under inspection, having a curved surface, at an increment of a pre-set angle of rotation, and an annular light 12 for illuminating the article under inspection 1. The figure inspection device also includes an imaging device 13 for imaging a figure inscribed on a curved surface of the article under inspection 1 at each increment of a pre-set angle and for outputting picture information data from plural viewing directions, and a picture processor 14 for synthesizing the plural picture information data from the imaging device 13 and for inspecting the figure inscribed on the curved surface of the article under inspection 1. The figure inspection device additionally includes a motor driver 15 for driving the electric motor 11 and a ball feeder 16 for aligning the articles under inspection. The figure inspection device finally includes a sorting unit 17 for sorting the inspected articles 1, an operating panel 18 actuated by an operator and a sequencer 20 for controlling the components 14 to 18.

The figure inspection device is adapted for rotating the articles under inspection 1 at each increment of a pre-set angle for dividing the figure on the curved surface into plural imaginary sections in order to fetch picture information data from plural directions. The figure inspection device synthesizes the information of the fractional figures for inspecting the figure drawn on the curved surface of the article under inspection based upon the synthesized full-format picture information data.

Figure 2:
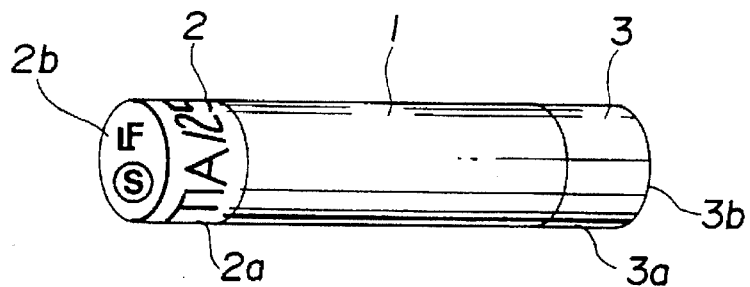
FIG. 2 is a perspective view showing an inscription on a glass tube fuse to be inspected by the figure inspection device shown in FIG. 1.

Specifically, the article under inspection 1 is a cylindrically-shaped glass tube fuse 1, as shown in FIG. 2. On an outer peripheral surface 2a and an end face 2b of an upper metal fixture 2 and on an outer peripheral surface 3a and an end face 3b of a lower metal fixture 3, there are inscribed figures, such as characters indicating rated values, e.g. rated current values or rated withstand voltages, or symbols, such as UK marks, CSA marks or marks for A-type electrical components. The glass tube fuse 1 is intermittently rotated about its cylindrical axis at an interval of a pre-set angle of, for example, 36°, by the electric motor 11, such as an AC servo motor. The rotational angle of the electric motor 11 is controlled by the sequencer 20, such that the motor driver 15 runs the electric motor 11 in rotation based upon the control signal from the sequencer 20. The rotational angle for such intermittent rotation is not limited to 36° and may be suitably determined based upon the curvature of the outer peripheral surfaces 2a and 3a, or the size or status of the inscriptions.

TABLE 1

| | INSCRIPTIONS |
|---|---|
| 2a | T1A/250V |
| 2b | ⌊F Ⓢ |
| 3b | ▽ |

TABLE 2

| ARTICLE TYPES | INSCRIPTIONS | |
|---|---|---|
| <217 SERIES> | UPPER | LOWER |
| 217.032 | F32mA/250V | ⌊F Ⓢ |
| | Ⓕ32mA/250V | ⌊F Ⓢ |
| | F32mA⌋250V | ⌊F Ⓢ |
| 217.040 | F40mA/250V | ⌊F Ⓢ |
| | Ⓕ40mA/250V | ⌊F Ⓢ |
| | F40mA⌋250V | ⌊F Ⓢ |
| 217.050 | F50mA/250V | ⌊F Ⓢ |
| | Ⓕ50mA/250V | ⌊F Ⓢ |
| | F50mA⌋250V | ⌊F Ⓢ |
| 217.063 | F63mA/250V | ⌊F Ⓢ |
| | Ⓕ63mA/250V | ⌊F Ⓢ |
| | F63mA⌋250V | ⌊F Ⓢ |
| 217.080 | F80mA/250V | ⌊F Ⓢ |
| | Ⓕ80mA/250V | ⌊F Ⓢ |
| | F80mA⌋250V | ⌊F Ⓢ |
| 217.100 | F100mA/250V | ⌊F Ⓢ |
| | Ⓕ100mA/250V | ⌊F Ⓢ |
| | F100mA⌋250V | ⌊F Ⓢ |
| 217.125 | F125mA/250V | ⌊F Ⓢ |
| | Ⓕ125mA/250V | ⌊F Ⓢ |
| | F125mA⌋250V | ⌊F Ⓢ |
| 217.160 | F160mA/250V | ⌊F Ⓢ |
| | Ⓕ160mA/250V | ⌊F Ⓢ |
| | F160mA⌋250V | ⌊F Ⓢ |
| 217.200 | F200mA/250V | ⌊F Ⓢ |
| | Ⓕ200mA/250V | ⌊F Ⓢ |
| | F200mA⌋250V | ⌊F Ⓢ |
| 217.250 | F250mA/250V | ⌊F Ⓢ |
| | Ⓕ250mA/250V | ⌊F Ⓢ |
| | F250mA⌋250V | ⌊F Ⓢ |
| 217.315 | F315mA/250V | ⌊F Ⓢ |
| | Ⓕ315mA/250V | ⌊F Ⓢ |
| | F315mA⌋250V | ⌊F Ⓢ |
| 217.400 | F400mA/250V | NONE |
| | F400mA⌋250V | NONE |
| 217.500 | F500mA/250V | NONE |
| | F500mA⌋250V | NONE |
| 217.630 | F630mA/250V | NONE |
| | F630mA⌋250V | NONE |
| 217.800 | F800mA/250V | NONE |
| | F800mA⌋250V | NONE |

The annular light 12 is constituted by optical fibers each being 120 nm in inner diameter, and has a halogen lamp 12a as a light source, as shown in FIG. 1. The annular light 12 lights the glass tube fuse 1 arranged at a position spaced apart a distance of 17 mm ($D_1$), via a diffuse 12b spaced apart a distance of 5 mm ($D_2$), so that recessed portions of the inscriptions become shadow regions. As a result, the picture information of the colorless inscriptions on the outer peripheral surfaces 2a, 3a may be obtained in a state satisfactory for inspection.

The imaging device 13 is a CCD video camera (video camera 13) having a standard 35 mm lens and images the glass tube fuse 1 rotated by the motor 11 at an angular interval of e.g. 36° and transmits the picture information of a plurality of, herein 11 (=360/36+1) fractional pictures to the picture processor 14.

The picture processor 14 discards one of the 11 fractional pictures of the picture information from the video camera 13 obtained in redundancy in order to synthesize the full-format picture information. The picture processor 14 inspects whether or not the glass tube fuse is acceptable and transmits the result of the inspection via its own digital I/O port to the sequencer 20. The sequencer 20 controls the sorter 17 based upon the results of the inspection for separating good glass tube fuses from the no-good glass tube fuses.

Figure 3A:
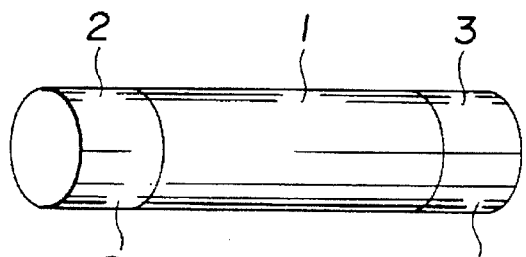
FIGS. 3A to 3H illustrate specific examples of rejectable inscriptions on the glass tube fuse.
Figure 3E:
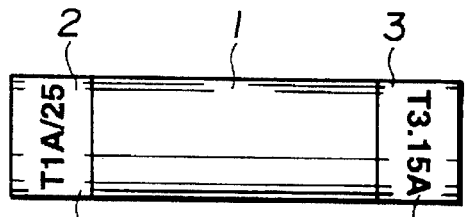
Figure 3B:
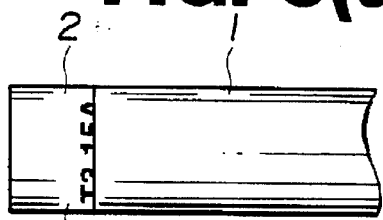
Figure 3F:
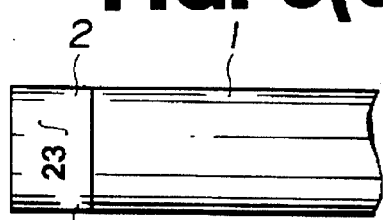
Figure 3C:
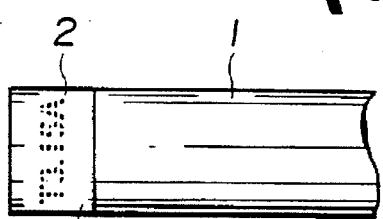
Figure 3G:
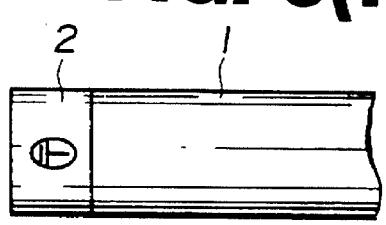
Figure 3D:
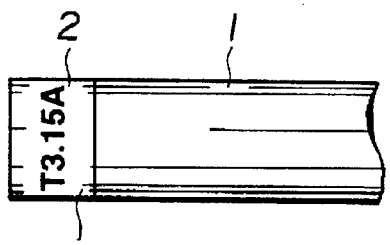
Figure 3H:
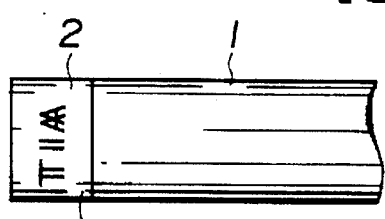

The picture processor 14 detects imperfections in the inscriptions, such as the absence of inscriptions on the outer peripheral surfaces 2a, 3a of the metal fixtures 2, 3 (FIG. 3A), offset inscriptions on the outer peripheral surfaces 2a, 3a (FIG. 3B), pale or indistinct inscriptions on the outer peripheral surfaces 2a, 3a (FIG. 3C), incorrectly rated values on the outer peripheral surfaces 2a, 3a (FIG. 3D), different inscriptions made on the outer peripheral surfaces 2a, 3a (FIG. 3E), marred character inscriptions on the metal fixture 2 (FIG. 3F), marred symbol inscriptions on the metal fixture 2 (FIG. 3G) or overlapped inscriptions on the outer peripheral surface 2 (FIG. 3H). The sequencer 20 controls the sorter 17 depending on the results of the inspection from the picture processor 14 in a manner as described previously.

The inspecting operation performed by the picture processor 14 is now explained in detail. There are many versions, such as 250 versions, in the glass tube fuse 1. For inspecting the glass tube fuses with high maneuvability and high efficiency, the present figure inspecting device employs a so-called menu system in which the operating sequence is instructed to the operator under a conversation mode. That is, the operating panel 18 has a so-called touch-panel 18a which the operator uses in order to select the glass tube fuse version under inspection or in order to add or modify versions.

Figure 4:
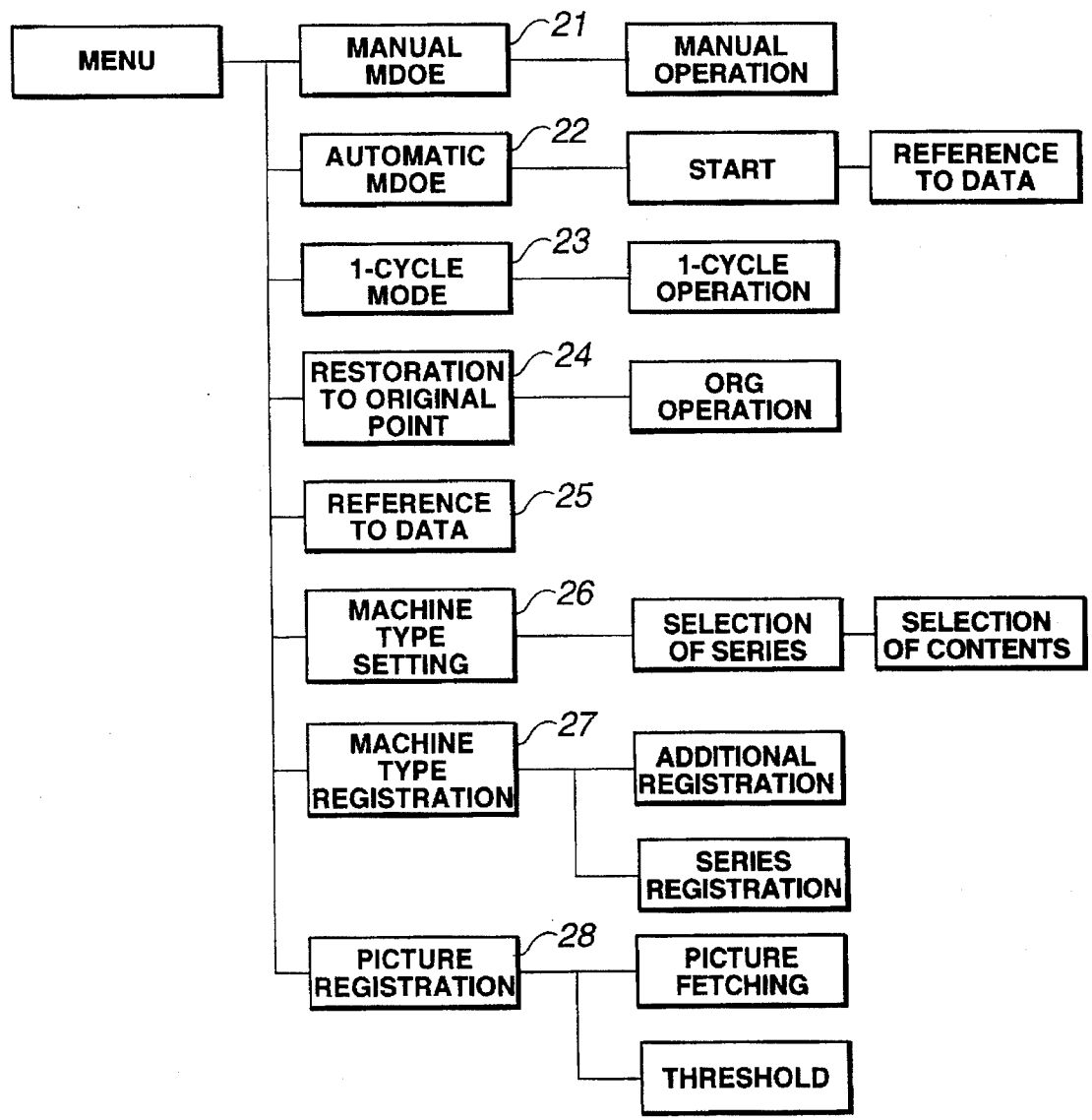
FIG. 4 illustrates operating modes owned by a picture processor of the figure inspection device shown in FIG. 1.

Specifically, the sequencer 20 includes a manual mode 21 for carrying out the inspection in accordance with the operator's stepwise operation, an automatic mode 22 for automating the inspection, a one-cycle mode 23 for intermittently carrying out the inspection on the cycle basis, a reset-to-original point mode 24, a machine type setting mode of setting the versions of the glass tube fuses under inspection 26, a machine type registration mode of registering the glass tube fuse of the new version, and a picture registration mode 28, as shown in FIG. 4.

Figure 5:
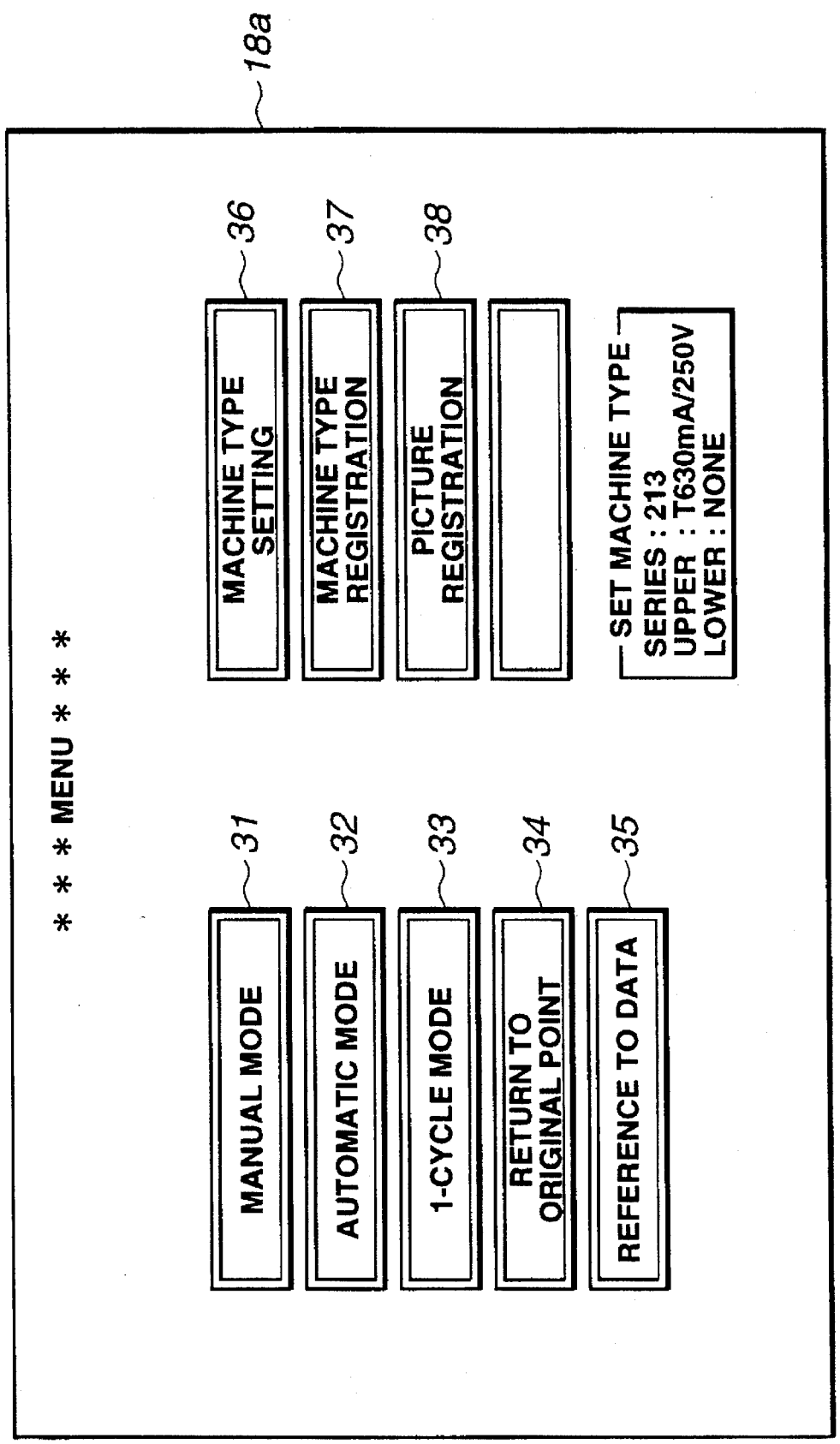
FIG. 5 illustrates a specific example of a menu displayed on an operating board of the figure inspection device shown in FIG. 1.

The sequencer 20 controls the operating panel 18 for displaying iconographic models 31 to 38 on the touch panel 18a, as shown for example in FIG. 5. These iconographic models are operational displays associated with the manual mode 21 to the picture registration mode 28. The screen on which the iconographic models are indicated is termed a menu screen. If the operator touches one of the indicated iconographic models 31 to 38 with his or her finger, the function of the mode associated with the iconographic model thus selected comes into operation.

Figure 6:
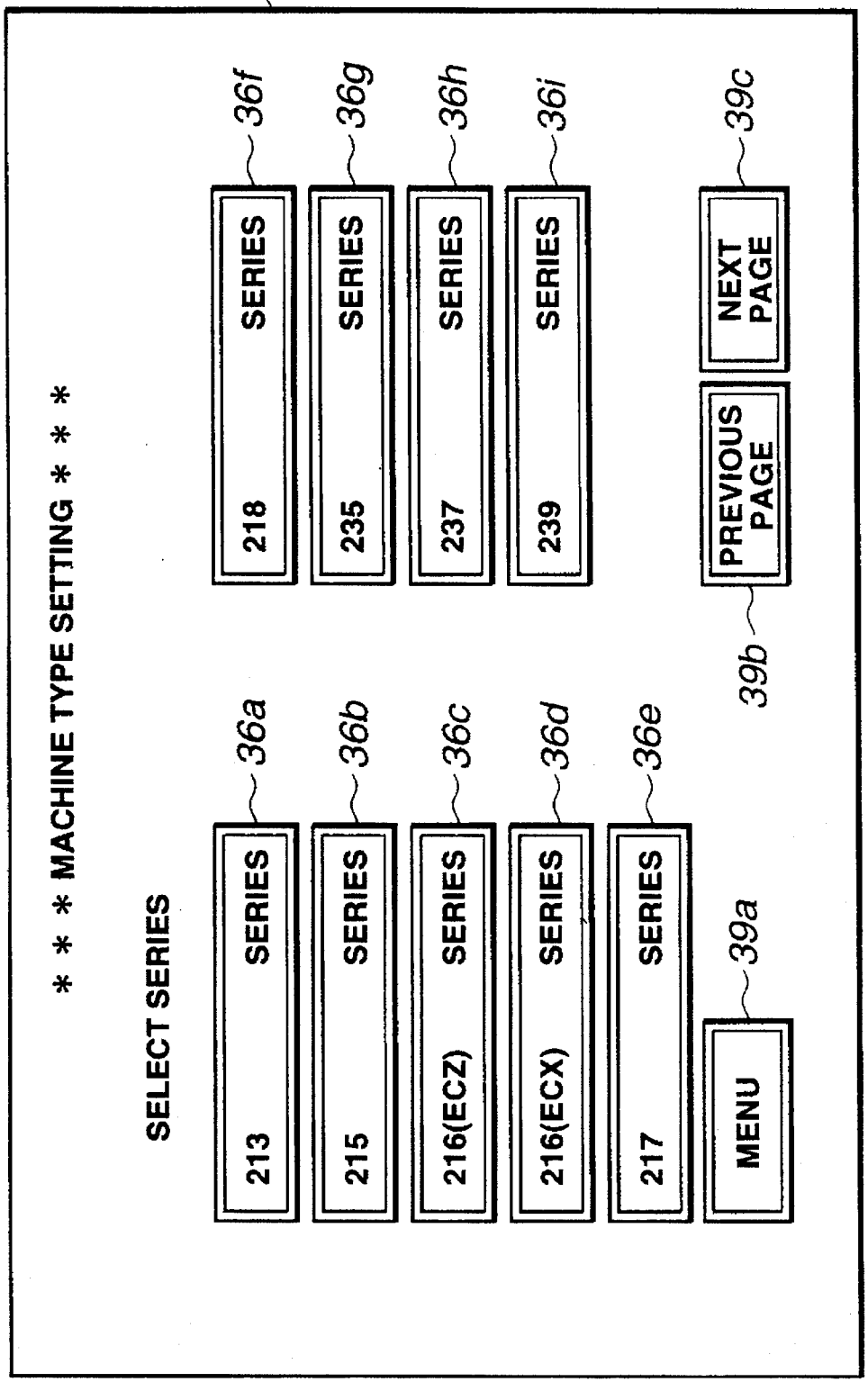
FIG. 6 illustrates a display example on the operating mode during the machine type setting mode.

The version setting of the glass tube fuse, an article under inspection, is now explained. If the operator selects the iconographic model 36 associated with the machine type setting mode 26 on the menu screen, a signal associated with such operation is routed from the operating panel 18 via e.g. a RS 232C interface to the sequencer 20. The sequencer 20 controls the operating panel 18 for displaying iconographic models 36a, 36b, 36c, 36d, 36e, 36f, 36g, 36h and 36i, indicating the series numbers of the glass tube fuses, for which characters such as rated values or symbols such as UL standard marks, have already been registered, such as 213 series, 215 series, 216 (ECZ) series, 216 (ECX) series, 217 series, 218 series, 295 series, 237 series and 299 series, respectively, and for displaying a menu iconographic model 39a displaying the menu screen, an iconographic model 39b for a previous page and an iconographic model 39c for the next page, as shown for example in FIG. 6. The screen with such display is termed a series selecting screen.

Figure 7:
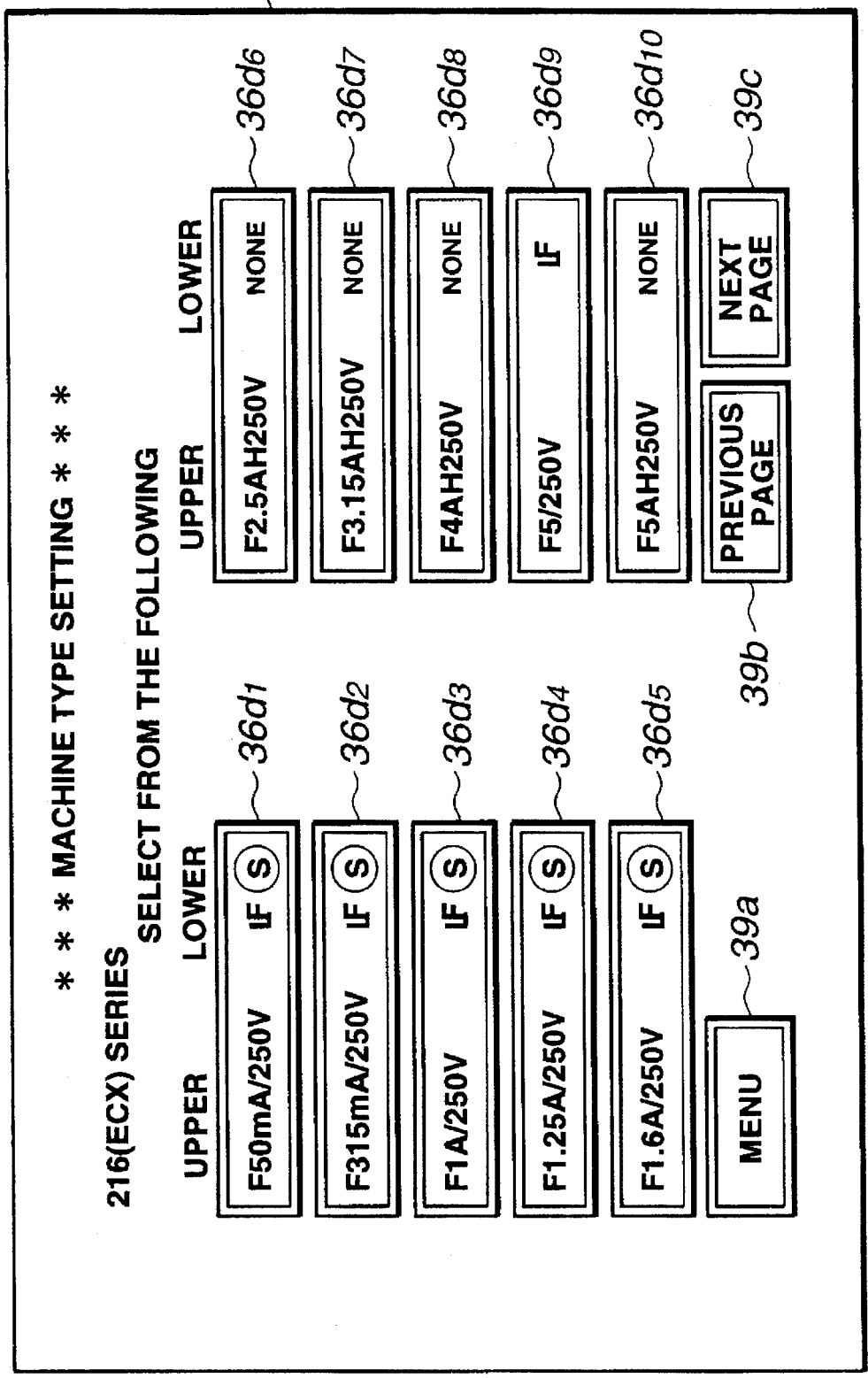
FIG. 7 illustrates another display example on the operating mode during the machine type setting mode.

If next the operator selects the iconographic model 36d associated with the 216 (ECX) series on the series selecting screen, the sequencer 20 controls the operating panel 18 for displaying iconographic models $36d_1$, $36d_2$, $36d_3$, $36d_4$, $36d_5$, $36d_6$, $36d_7$, $36d_8$, $36d_9$ and $36d_{10}$, indicating rated values of the versions belonging to the 216 (ECX) series, such as F50mA/250V, F315mA/250V, F1AH250V, F1.25A/250V, F1.6A/250V, F2.5AH250V, F3.15AH250V, F4AH/250V, F5/250V and F5AH250V, respectively, as shown for example in FIG. 7. If the versions belonging to one series cannot be displayed on one screen, the operator thrusts the iconographic model for the next page 39c. The sequencer 20 then controls the operating panel 18 for displaying the iconographic models $36d_{11}$, $36d_{12}$, $36d_{13}$ and $36d_{14}$, indicating rated values of the remaining versions, that is. F6.3/250V, F6.3AH250V, F8A/250V and F10AH250V, respectively, as shown for example in FIG. 8.

Figure 9:
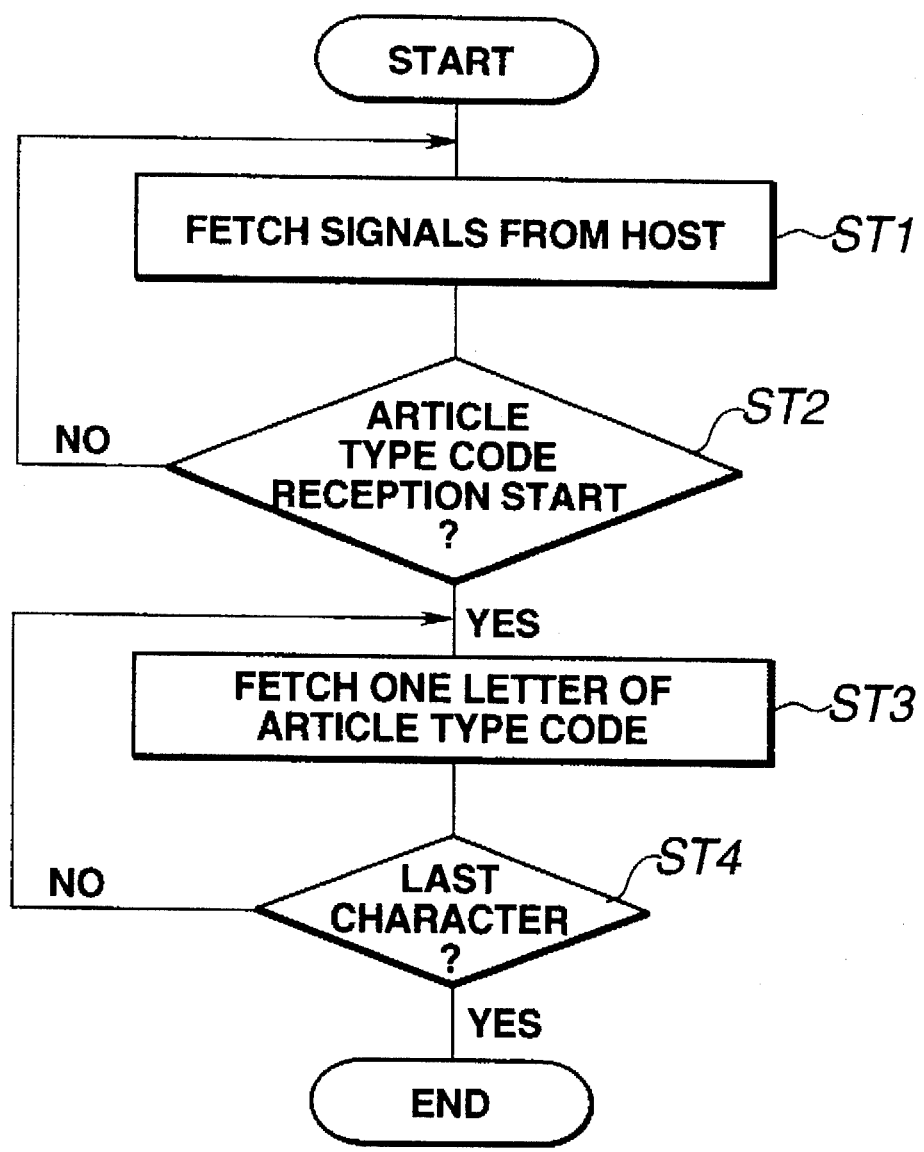
FIG. 9 is a flow chart for illustrating an initializing operation for the figure inspection device shown in FIG. 1.

If the operator selects the iconographic model associated with the desired version, the sequencer 20 routes the version code selected by the operator to the picture processor 14, which then fetches the version code in accordance with the flow chart shown in FIG. 9.

At a step ST1, the picture processor 14 detects the signal supplied from the sequencer 20 via a digital I/O port. The picture processor then proceeds to a Step ST2.

At the step ST2, the picture processor 14 detects whether or not the version code has been received. If the result of detection is YES, the picture processor proceeds to a step ST3 and, if the result is NO, the picture processor reverts to the step ST1.

At the step ST3, the picture processor 14 fetches one character or one symbol of the version code, before proceeding to a step ST4.

At the step ST4, the picture processor 14 determines whether or not the fetching of the last character (or symbol, hereinafter the same) of the version code has come to an end. If the result is YES, the version code fetching operation comes to a close. If otherwise, the picture processor reverts to the step ST3. That is, if the number of the characters of the version code inscribed on the upper metal fixture 2 is 12, and that inscribed on the lower metal fixture 3 is 6, the picture processor 14 iterates the processing of the step ST3 18 times before terminating the version code fetching. The above-described processing is termed an initializing processing operation.

When the initializing processing operation comes to an end as described above, the picture processor 14 inspects the inscriptions in accordance with the flow chart shown in FIG.

10. That is, at a step ST1, the picture processor 14 detects the signal from the sequencer 20, before proceeding to a step ST2.

At the step ST2, the picture processor 14 checks whether or not a command signal for starting the inspection has been received. If the result is YES, the picture processor proceeds to a step ST3 and, if otherwise, reverts to the step ST1.

At the step ST3, the picture processor 14 fetches the picture information from the video camera 13, while routing a command for rotating the glass tube fuse 1 to the sequencer 20, before proceeding to a step ST4. Specifically, the picture processor 14 fetches the information of 11 fractional pictures (picture fractions) of the outer peripheral surfaces 2a and 3a of the metal fixtures 2, 3, imaged by the video camera 13, while the glass tube fuse 1 makes a rotation through 396° (=360°+36°). The redundant picture fraction is discarded and the remaining ten picture fractions are synthesized. In this manner, if inscriptions are on the peripheral surfaces 2a, 3a in their entirety, the picture data may be prevented from being overlooked by imaging the picture by rotating it through more than 360°.

At the step ST4, the picture processor 14 analyzes the synthesized picture fractions character by character by so-called letter matching by way of performing character recognition. The picture processor then proceeds to a step ST5.

At the step ST5, the picture processor 14 compares a character string composed of characters or symbols recognized character by character to a pre-set control version code, as read by the initializing processing operation, by way of performing version code matching. The picture processor then proceeds to a step ST6.

At the step ST6, the picture processor 14 scrutinizes the result of version code matching in order to check if the matching is good. If the state of matching found to be no-good, the picture processor proceeds to a step ST7 and, if the result is found to be good, the picture processor proceeds to a step ST10.

At the step ST7, it is checked whether or not the matching is clearly no-good. If the result of check is YES, the picture processor proceeds to a step ST9 and, if otherwise, proceeds to a step ST8.

At the step ST8, the picture processor 14 sets a retry flag indicating a second inspection, before proceeding to a step ST10.

At the step ST9, the picture processor 14 finds the glass tube fuse 1, on which the inspection has come to an end, as being no-good, and routes the negative result to the sequencer 20, which then controls the sorter 17 for recovering the glass tube fuse 1 into a no-good fuse recovery box, not shown.

At the step ST10, the picture processor 14 checks if the retry flag has been set. If the result is YES, the picture processor reverts to the step S3 and, if otherwise, it proceeds to a step ST11.

At the step ST11, the picture processor 14 determines the glass tube fuse 1, on which the inspection has come to an end, as being good, and routes the positive result to the sequencer 20. The sequencer controls the sorter 17 for recovering the glass tube fuse 1 into the good article recovery box, not shown.

The inspection of inscriptions on the glass tube fuses now comes to an end. That is, with the present figure inspection device, the version code inscriptions on the outer peripheral surfaces 2a and 3a of the glass tube fuses 2, 3 are divided into plural fractions, as the glass tube fuses each having a curved surface are rotated at an interval of a pre-set angle, and the picture information is fetched from plural directions. These picture fractions are synthesized and the inscriptions are inspected based upon the synthesized picture information data thus enabling automated and quantitative decision on acceptability in a manner distinct from the conventional functional test. That is, the inspection may be achieved without regard to difference in skill from one operator to another. On the other hand, the operator may be relieved of a monotonous iterative operation, while the manpower cost may be diminished.

Figure 11:
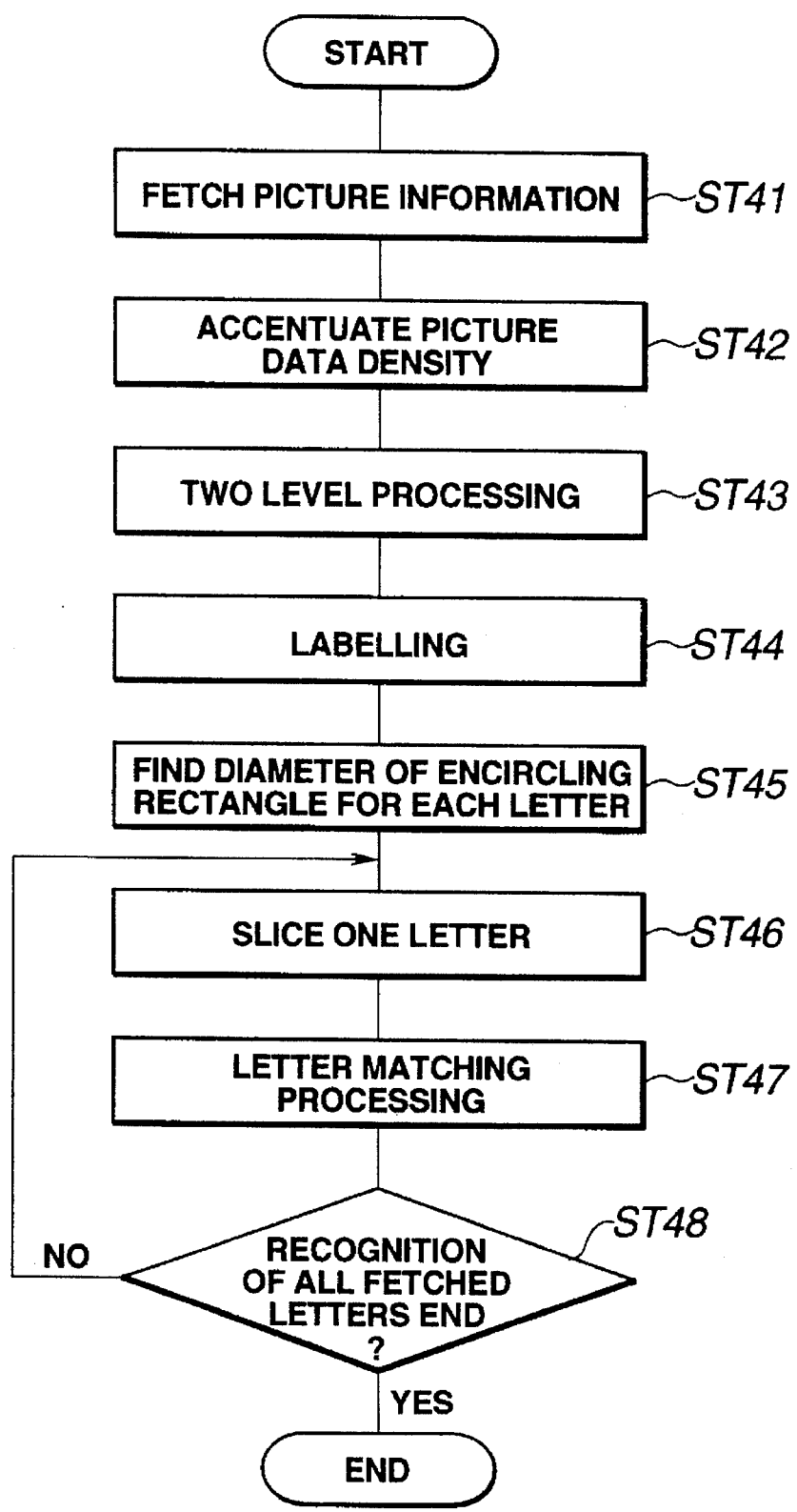
FIG. 11 is a flow chart for illustrating a letter matching operation during the figure inspection.
Figure 19:
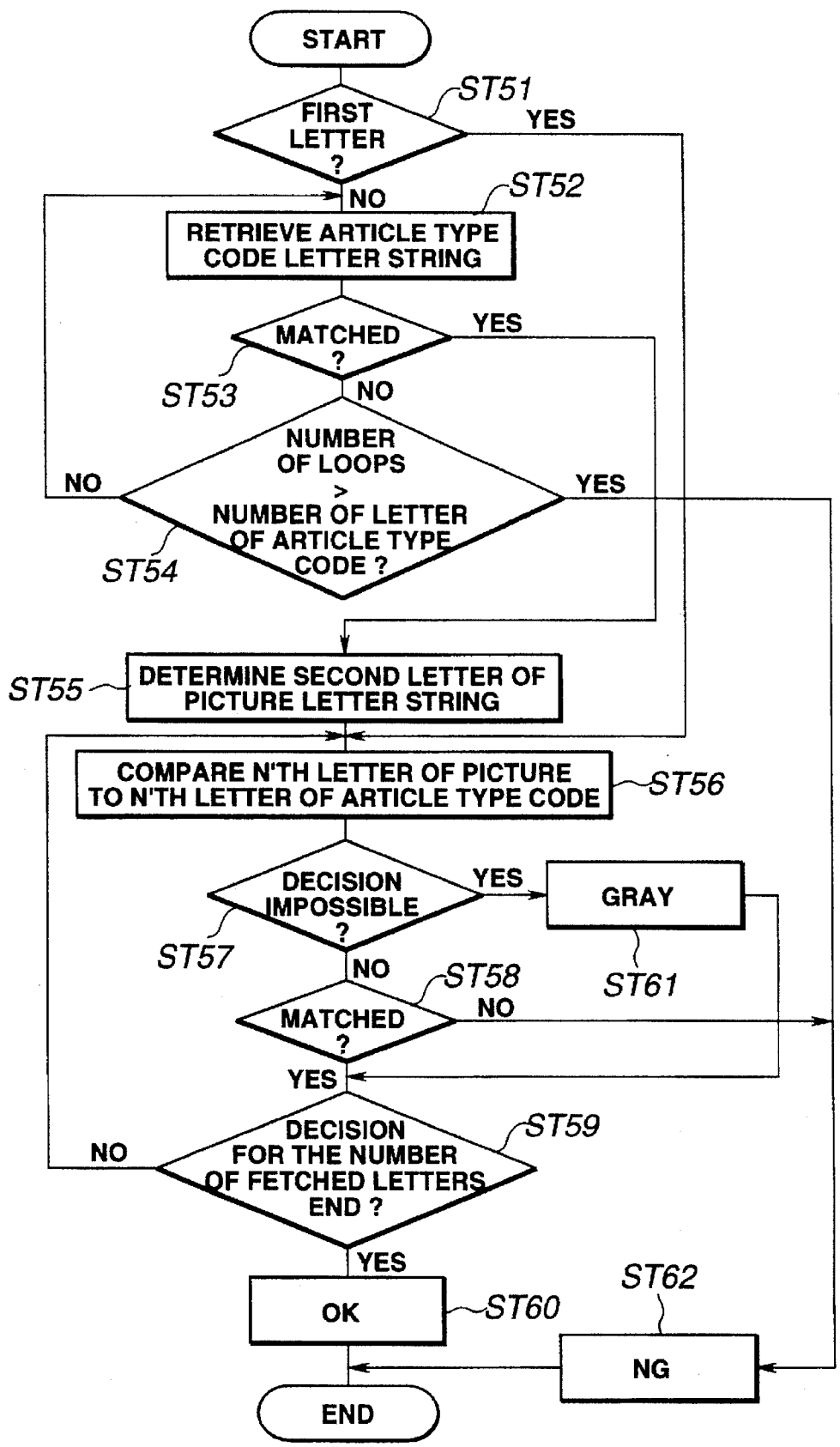
FIG. 19 is a flow chart for article type code matching during figure inspection.

Specific examples of the picture data fetching operation at the step ST3, the letter matching operation at the step ST4 and the version code matching at the step ST5 are explained in accordance with the flow charts shown in FIGS. 11 and 19.

Figure 10:
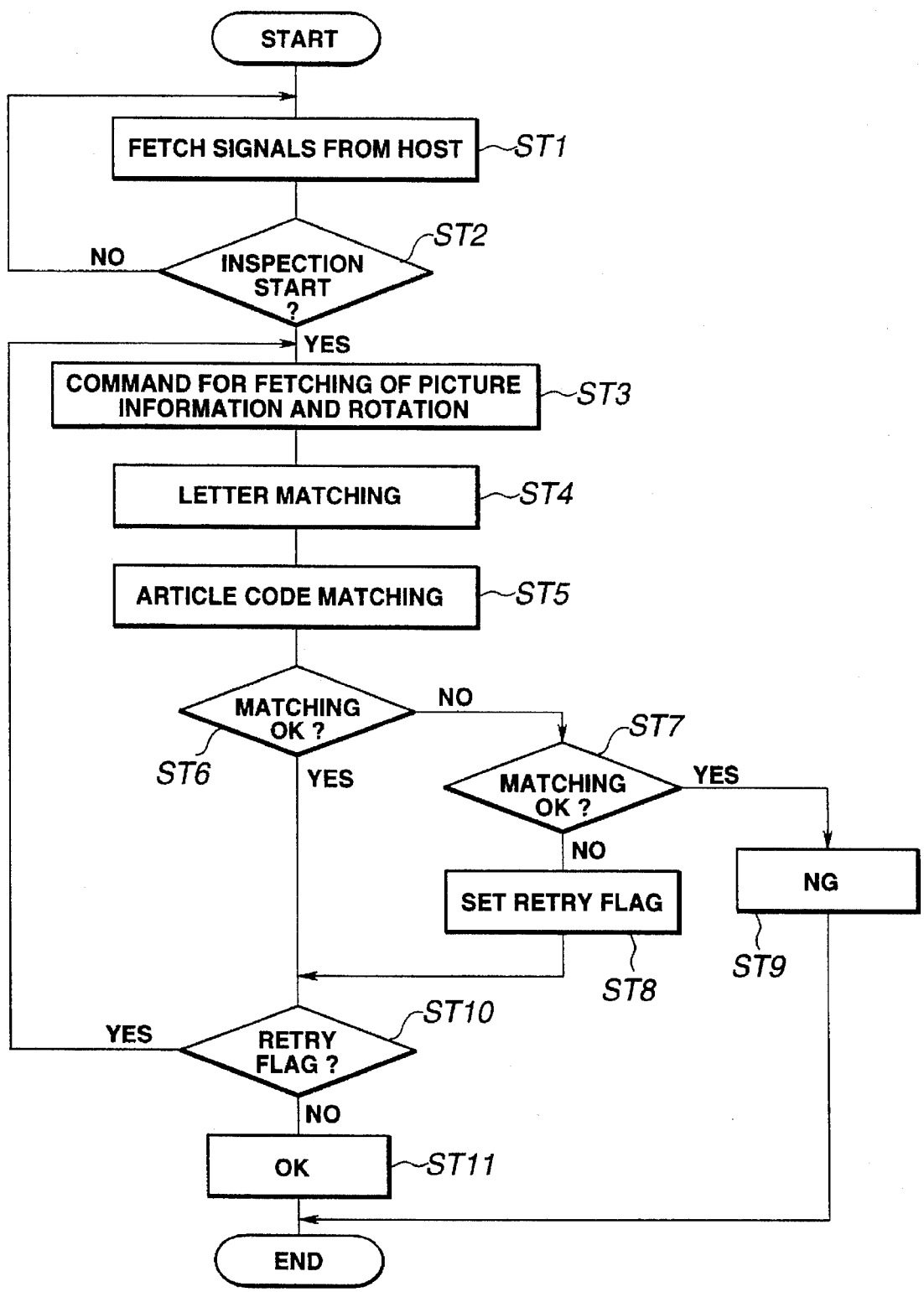
FIG. 10 is a flow chart for illustrating an inspecting operation by the figure inspection device shown in FIG. 1.
Figure 12:
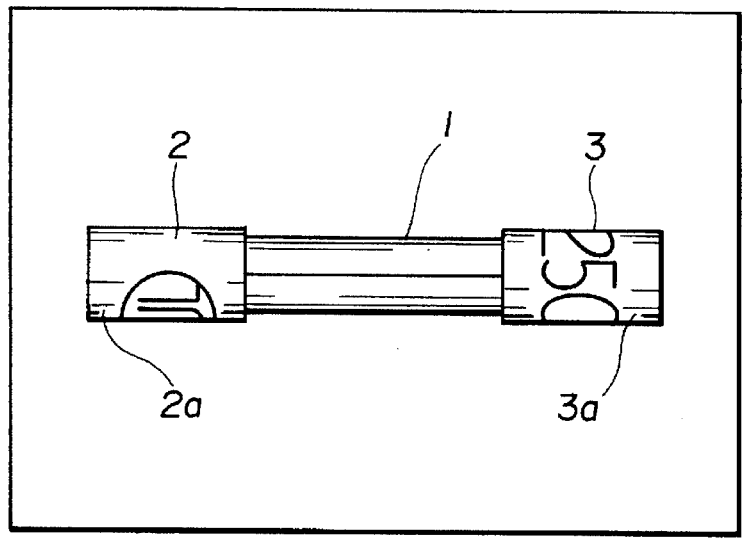
FIG. 12 illustrates a specific example of a picture taken by a video camera of the figure inspection device shown in FIG. 1.
Figure 13:
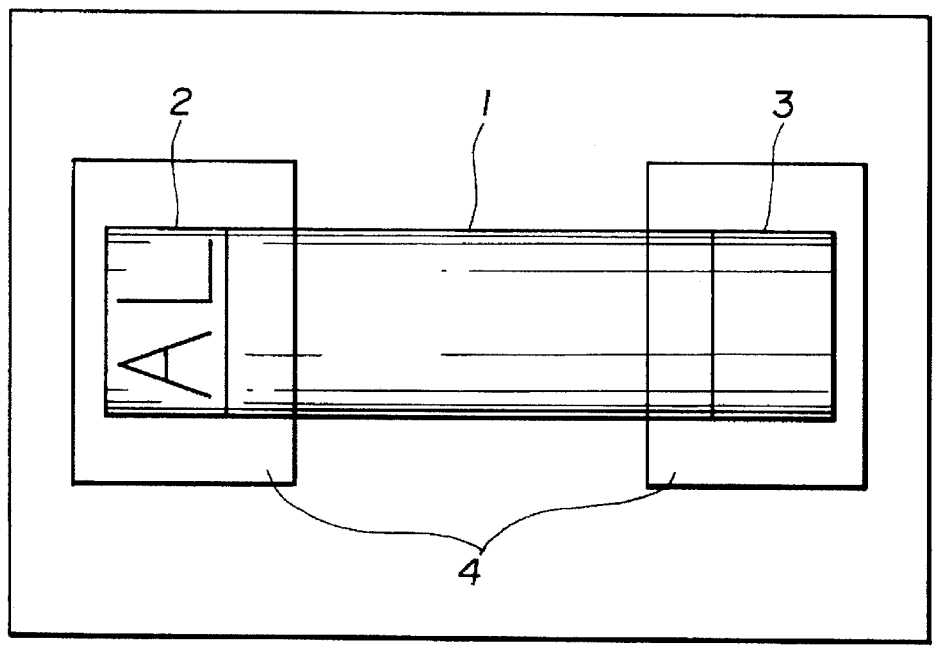
FIG. 13 illustrates a window for fetching the picture information during the figure inspection.
Figure 14:
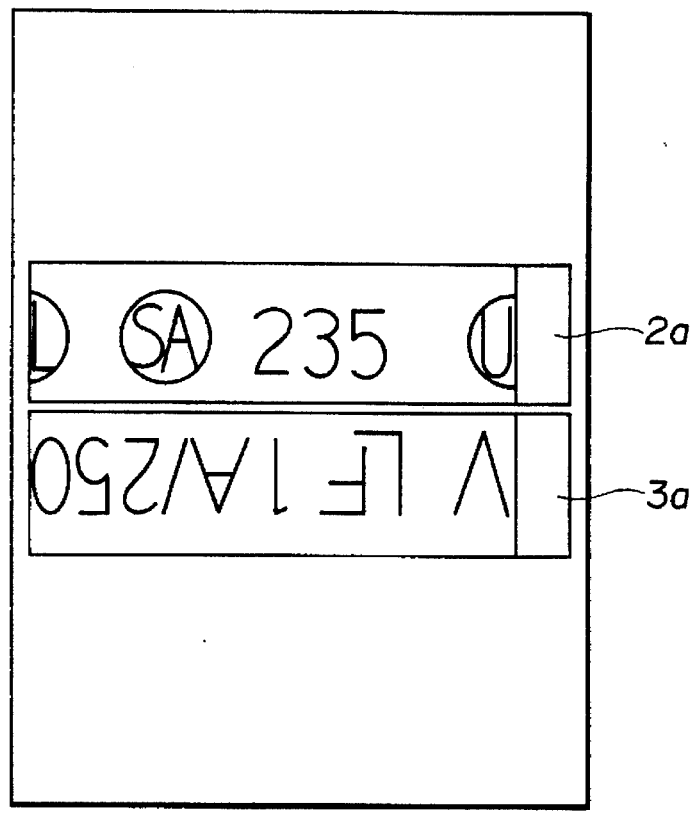
FIG. 14 illustrates a specific example of the synthesized picture information.

At a step ST41 of FIG. 11, corresponding to the step ST3 in FIG. 10, the picture processor 14 is fed from the video camera 13 with the picture information obtained on imaging the glass tube fuse 1 lighted by the annular light 12 under lightly interrupted extraneous light, such as the picture information of the entire glass tube fuse 1, as shown for example in FIG. 12. The picture processor 14 provides a window 4 encircling the metal fixtures 2 and 3 for fetching the picture information data confined within the window 4, as shown for example in FIG. 13. The picture processor 14 synthesizes the picture data thus fetched and generates picture information as shown in FIG. 14 in which the outer peripheral surfaces 2a and 3a of the metal fixtures 2 and 3 are developed in a plan as shown for example in FIG. 14. The picture processor then proceeds to a step ST42. That is, with the present figure inspection device, wasteful portions of the picture information as obtained on imaging with the video camera 13 are discarded from the inspection for expediting the processing. The picture information is formed by the picture data in which the luminance of each pixel is represented by data of a pre-set number of bits.

At the step ST42, the picture processor 14 processes the picture information with density accentuation for preventing breaks in characters. The picture information thus accentuated in density is referred to herein as picture data. The picture processor then proceeds to a step ST43.

At the step ST43, the picture processor 14 converts the picture data into corresponding bi-level data before proceeding to a step ST44.

At the step ST44, the picture processor 14 grasps the number of characters by so-called labelling before proceeding to a step ST45.

Figure 15:
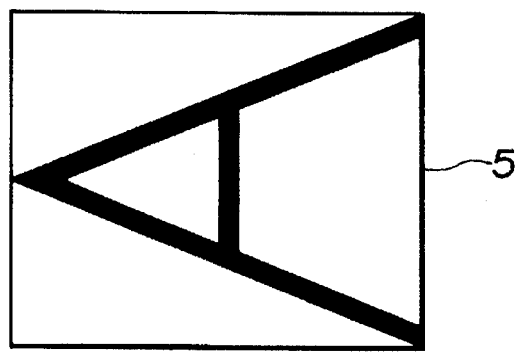
FIG. 15 illustrates a circumscribed rectangle which is employed during letter matching.

At the step ST45, the picture processor 14 finds the size of the circumscribed rectangle of each character as shown for example in FIG. 15 before proceeding to a step ST46.

At the step ST46, the picture processor 14 slices a character before proceeding to a step ST47.

At the step ST47, the picture processor 14 performs character recognition by comparing the sliced character to a reference matrix pattern and also based upon the number of holes and the position of the center of gravity of the sliced character and upon the size of the circumscribed rectangle. The picture processor then proceeds to a step ST48. Specifically, if the sliced character is a letter "A" made up of 30 by 40 pixels, as shown for example in FIG. 16, this letter is analyzed by comparison with the matrix pattern 5 of "A" shown in FIG. 16B by way of performing letter recognition. Besides, character recognition is also performed based upon the number of holes and the positions of the centers of gravity 6a, 6b, as shown for example in FIG. 17. In addition, character recognition is also performed based upon the size of the circumscribed rectangles, because such size is 7, 8 and 9 for letters ".", "I" and "A", respectively and thus differs depending on the difference in the characters.

At the step ST48, the picture processor 14 decides whether or not the recognition operations in a number corresponding to the number of the fetched characters have come to an end. If the result of decision is YES, the processing comes to a close. If otherwise, the picture processor reverts to the step ST46.

Thus, the character recognition on the character-by-character basis comes to a close. The picture processor 14 then proceeds to version code matching.

That is, as shown in FIG. 19, the picture processor 14 decides at a step ST51 whether or not the first letter in the character string recognized on the character basis by the above-mentioned character matching coincides with the first character of the version code fetched by the above-mentioned initializing operation. The character string recognized on the character basis by the above-mentioned character matching is referred to herein as a picture character string. If the result of decision is YES, the picture processor proceeds to a step ST56 and, if otherwise, the picture processor proceeds to a step ST52. Specifically, if the picture character string is "AL250V T1" and the version code is "T1AL250V", since the first letter "A" of the picture character string is not coincident with the first letter "T" of the version code, the picture processor proceeds to the step ST52.

At the step ST52, the picture processor 14 fetches the next character of the version code, before proceeding to the step ST53. For example, the first and second processing operations of the step ST52 fetch the second letter "1" and the third letter "A" of the version code by way of performing retrieval of the version code character string.

At the step ST53, the picture processor 14 checks whether or not the first character of the picture character string coincides with the character fetched at the step ST52. If the result of check is YES, the picture processor proceeds to a step ST55 and, if otherwise, to a step ST54. That is, since the first letter "A" of the picture character string coincides with the third letter "A" of the version code, the picture processor proceeds to a step ST55.

If, at the step ST54, the number of time of the processing operations at the step ST53 exceeds the number of characters of the version code, the picture processor 14 takes the first character of the picture letter string as being undetectable from the version code, and proceeds to a step ST62. If otherwise, the picture processor reverts to the step ST52. Specifically, it is not clear which is the ordinal number of the character of the version code to which corresponds the leading character of the picture character string obtained in imaging the glass tube fuse 1. Thus, it is detected at a loop comprised of the steps ST52 to ST54 which is the ordinal number of the character of the version code to which corresponds the first letter of the picture character string.

At the step ST55, the picture processor 14 determines which are the ordinate numbers of the characters of the version code that correspond to the second character ff. of the picture character string. The picture processor then proceeds to a step ST56.

At the step ST56, the picture processor 14 compares an ith letter, i being 2 to n, of the picture character sting to a corresponding character of the version code, before proceeding to a step ST57. Specifically, at the first-time processing and the second-time processing of the step ST56, for example, the second letter "L" of the picture character string is compared to the third character of the version code string and the third letter "2" of the picture letter string is compared to the fourth letter "L" of the version code string, while the blank at the seventh letter of the picture character string is similarly compared to a blank assumed to be present downstream of the last character of the version character code.

At the step ST57, the picture processor 14 checks whether or not the ith letter of the picture character string is undiscernible as a character. If the result of check is YES, the picture processor proceeds to a step ST61 and, if otherwise, to a step ST98.

At the step ST58, the picture processor 14 checks from the results of comparison whether or not the state of matching exists. If the result of check is YES, the picture processor 14 proceeds to a step ST59 and, if otherwise, the picture processor proceeds to a step ST62.

At the step ST59, the picture processor 14 determines whether the determination of the characters of the picture character string has come to an end. If the result is YES, the picture processor 14 proceeds to a step ST60 and, if not, the picture processor reverts to a step ST56.

At the step ST60, the picture processor 14 finds the inspected glass tube fuse 1 to be good and the inspection is brought to a close.

At the step ST61, the picture processor 14 finds the inspected glass tube fuse 1 to be gray and proceeds to the step ST59.

At the step ST62, the picture processor 14 finds the inspected glass tube fuse 1 to be no-good and the inspection is brought to a close.

The inspection of the inscriptions on the outer peripheral surfaces 2a and 3a of the glass tube fuses 2 and 3 is now brought to a close. The inspection of the end faces 2b and 3b of the metal fixtures 2 and 3 may be carried out in a similar manner. Since the end faces 2b and 3b are planar, the picture information may be fetched without rotating the glass tube fuse 1.

Addition of new versions and modification of the versions are hereinafter explained.

Figure 20:
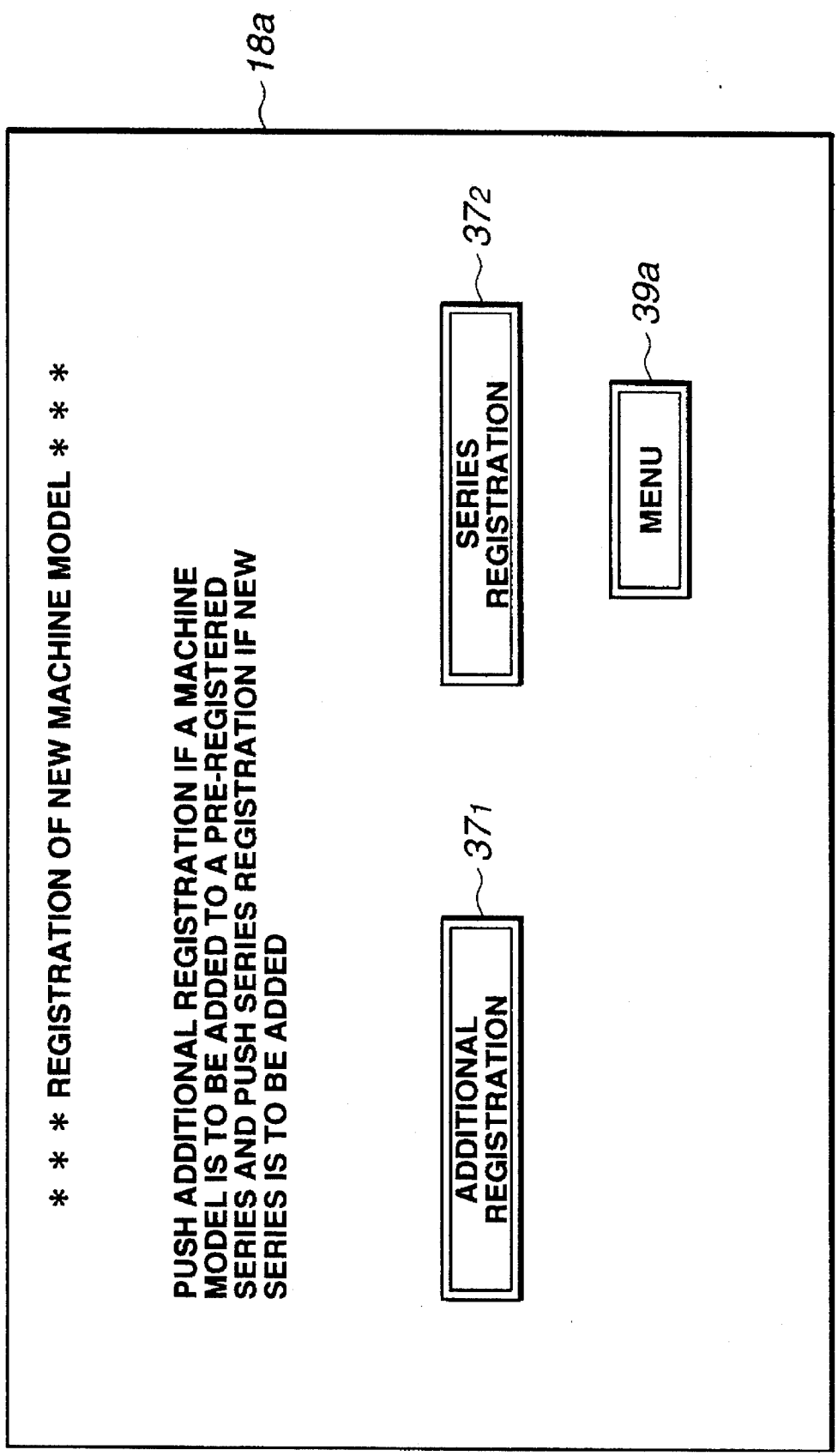
FIG. 20 illustrates a display example on the operating panel during machine type registration mode.

If the operator selects the iconographic model 37 associated with the machine type registration mode 27 on the menu screen shown in FIG. 5, the sequencer 20 controls the operating panel 18 for displaying an iconographic model $37_1$ indicating registration of new versions in addition to the series already registered on the touch panel 18a, and an iconographic model $37_2$ indicating registration of new series, as shown for example in FIG. 20. The display thus obtained is termed a display of registration of a new machine model.

Figure 21:
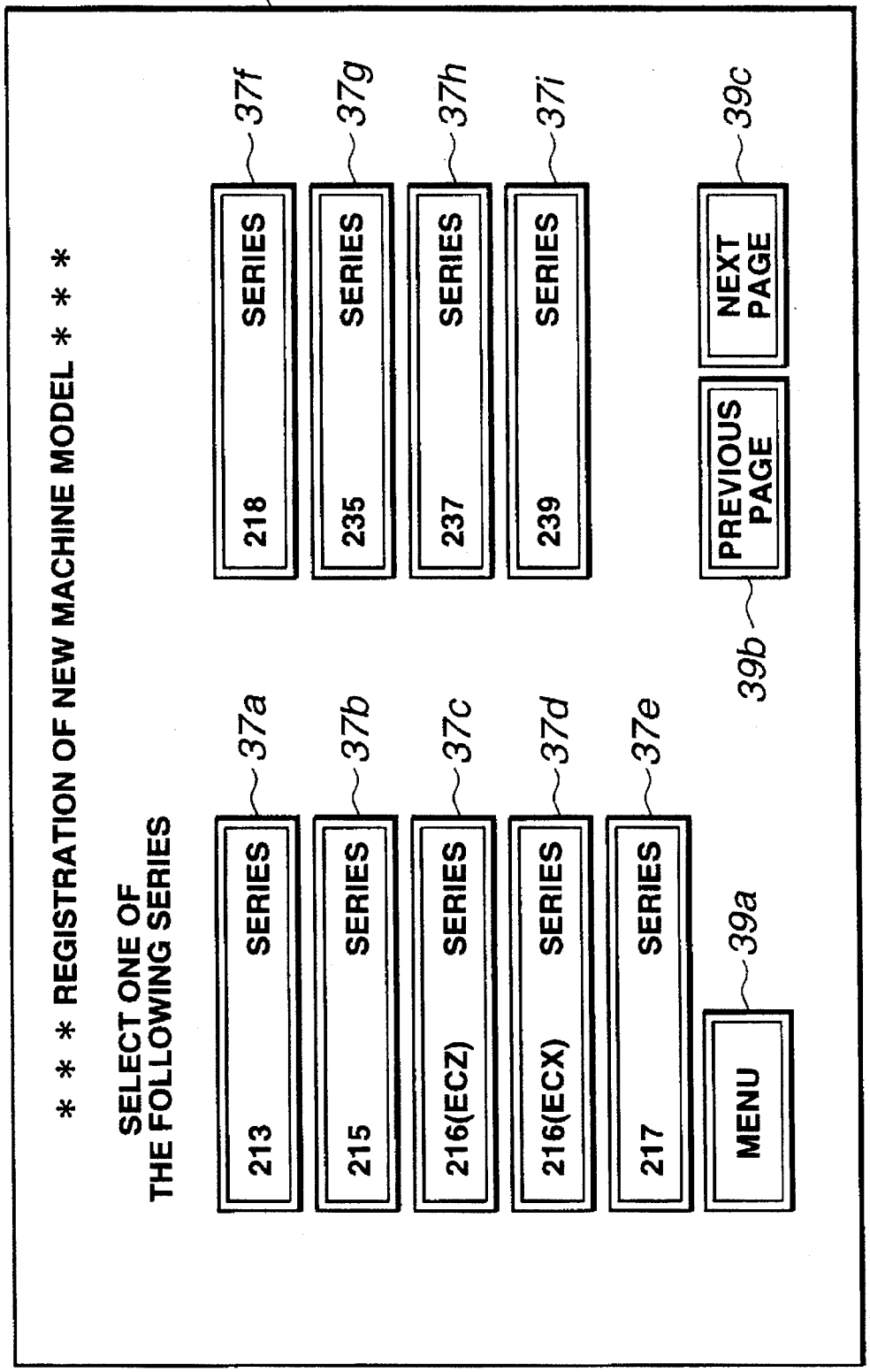
FIG. 21 illustrates another display example on the operating board during machine type registration mode.

If, in the display of registration of a new machine model, the operator selects an iconographic model $37_1$ associated with additional registration, the sequencer 20 controls the operating panel 18 for displaying iconographic models 37a, 37b, 37c, 37d, 37e, 37f, 37g, 37h and 37i, indicating the previously registered series, for example, 213 series, 215 series, 216 (ECZ) series, 216 (ECX) series, 217 series, 218 series, 235 series, 237 series and 339 series, respectively, as shown for example in FIG. 21.

Figure 22:
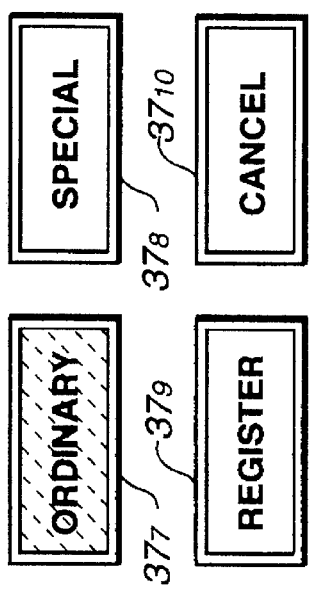
FIG. 22 illustrates a further display example on the operating board during machine type registration mode.
Figure 23:
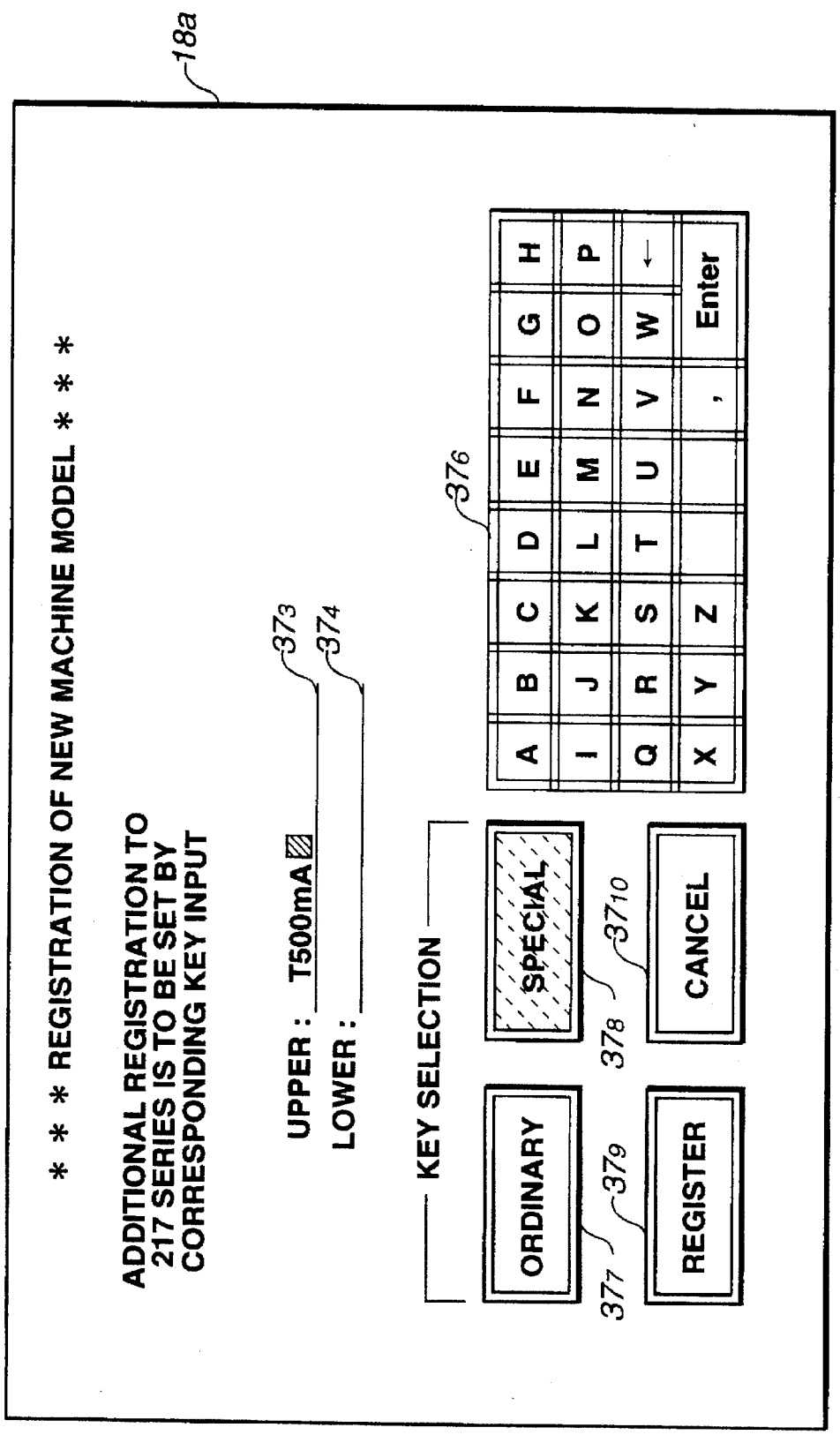
FIG. 23 illustrates a still further display example on the operating board during machine type registration mode.

If the operator selects the iconographic model 37e associated with, for example, the 217 series, the sequencer 20 controls the operating panel 18 for displaying an input data display area $37_3$ for displaying the version code for the upper metal fixture 2 entered by the operator, an input data display area $37_4$ for displaying the version code for the lower metal fixture 2 entered by the operator, an iconographic model $37_5$ indicating a key for entering symbols or numerals, an iconographic model $37_6$ (shown in FIG. 23) indicating a key for entering alphabetical letters, iconographic models $37_7$, $37_8$ for commutatively selecting the iconographic models $37_5$ and $37_6$, an iconographic model $37_9$ indicating registration of entered data and an iconographic model $37_{10}$ indicating cancellation of entered data, as shown for example in FIGS. 22 and 23. If the operator enters the version code in the input data display areas $37_3$, $37_4$, using the iconographic models $37_5$ or $37_6$, and thrusts the iconographic model $37_9$, the sequencer 20 registers the entered version code.

Figure 24:
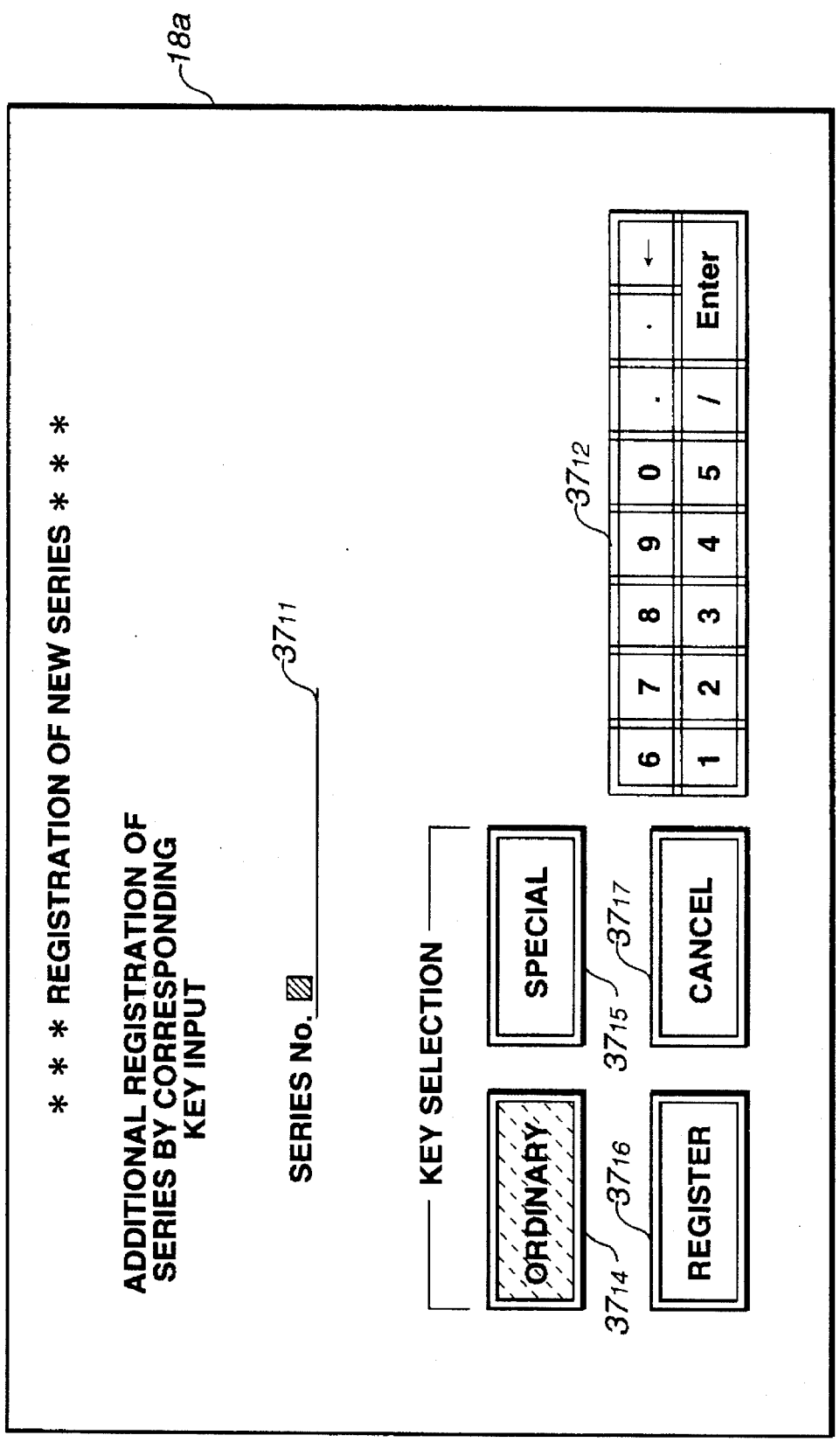
FIG. 24 illustrates a still further display example on the operating board during machine type registration mode.
Figure 25:
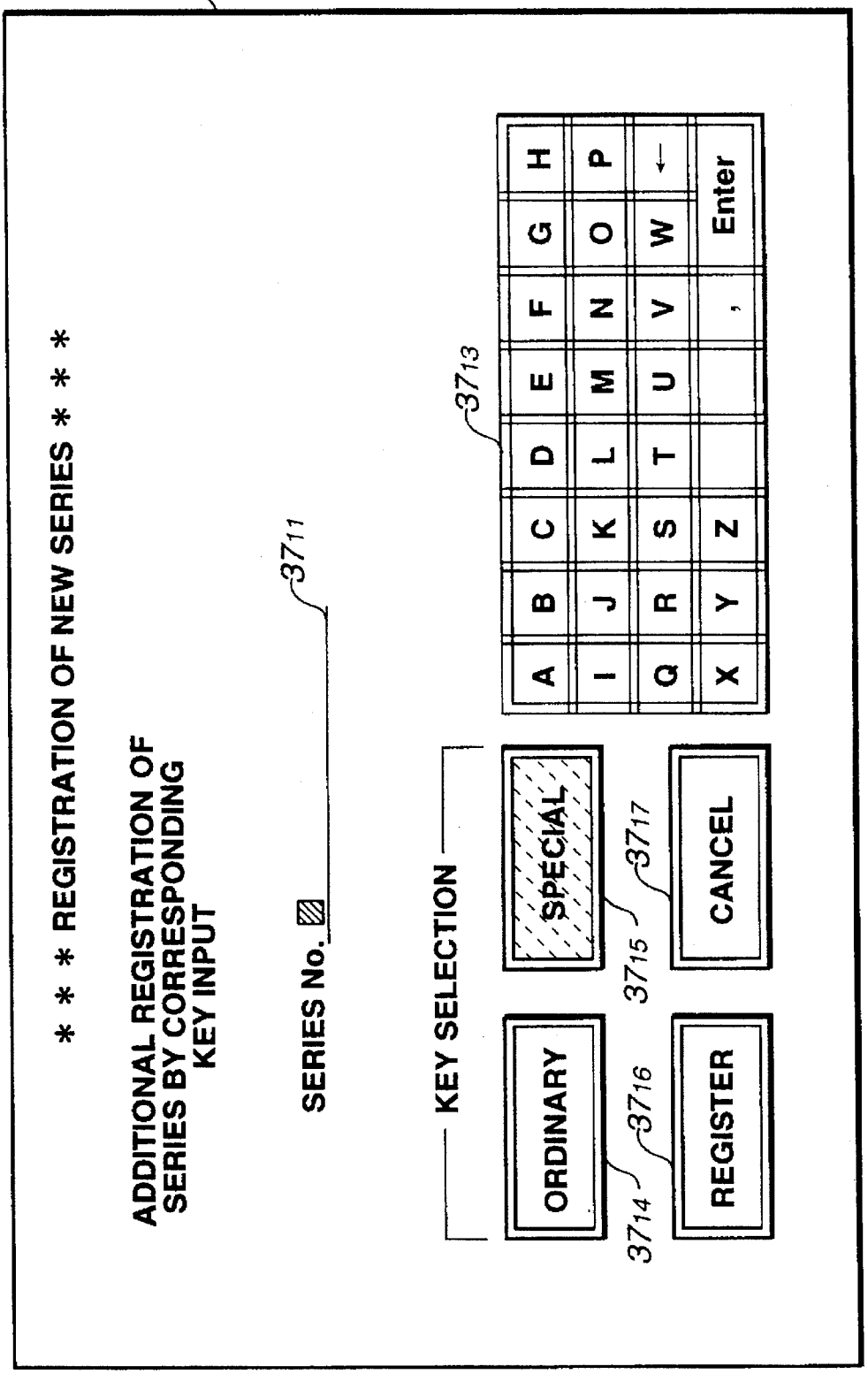
FIG. 25 illustrates yet another display example on the operating board during machine type registration mode.

If, in the display screen of registration of a new machine model, the operator selects an iconographic model $37_2$ associated with series registration, the sequencer 20 controls the operating panel 18 for displaying an input data display area $37_{11}$ for displaying the series number as entered by the operator, an iconographic model $37_{12}$ for displaying a key for entering symbols or numerals, an iconographic model $37_{13}$ (shown in FIG. 25) for entering alphabetical letters, iconographic models $37_{14}$, $37_{15}$ for commutatively selecting the iconographic models $37_{12}$, $37_{13}$, an iconographic model $37_{16}$ indicating registration of the input data and an iconographic model $37_{17}$ indicating cancellation of the input data, as shown for example in FIGS. 24 and 25. If the operator enters the series number in the input data display areas $37_{11}$, using the iconographic models $37_{12}$ or $37_{13}$, and thrusts the iconographic model $37_{16}$, the sequencer 20 registers the entered series number. Thus the version addition to the previously registered series or addition of new series may now be achieved.

The glass tube fuse inspection system for automatically inspecting the glass tube fuses is now briefly explained. The glass tube fuse inspection system includes four sets of picture fetching sections 41, each comprised of the motor 11, annular light 12 an the video camera 13, an index table 42 for aligning the glass tube fuses 1, a shutter 43 for distributing the glass tube fuses 1 from the index table 42 to the picture fetching sections 41 and a monitor receiver 44 for monitoring the picture obtained by the picture fetching section 41, as shown for example in FIG. 26.

Figure 26:
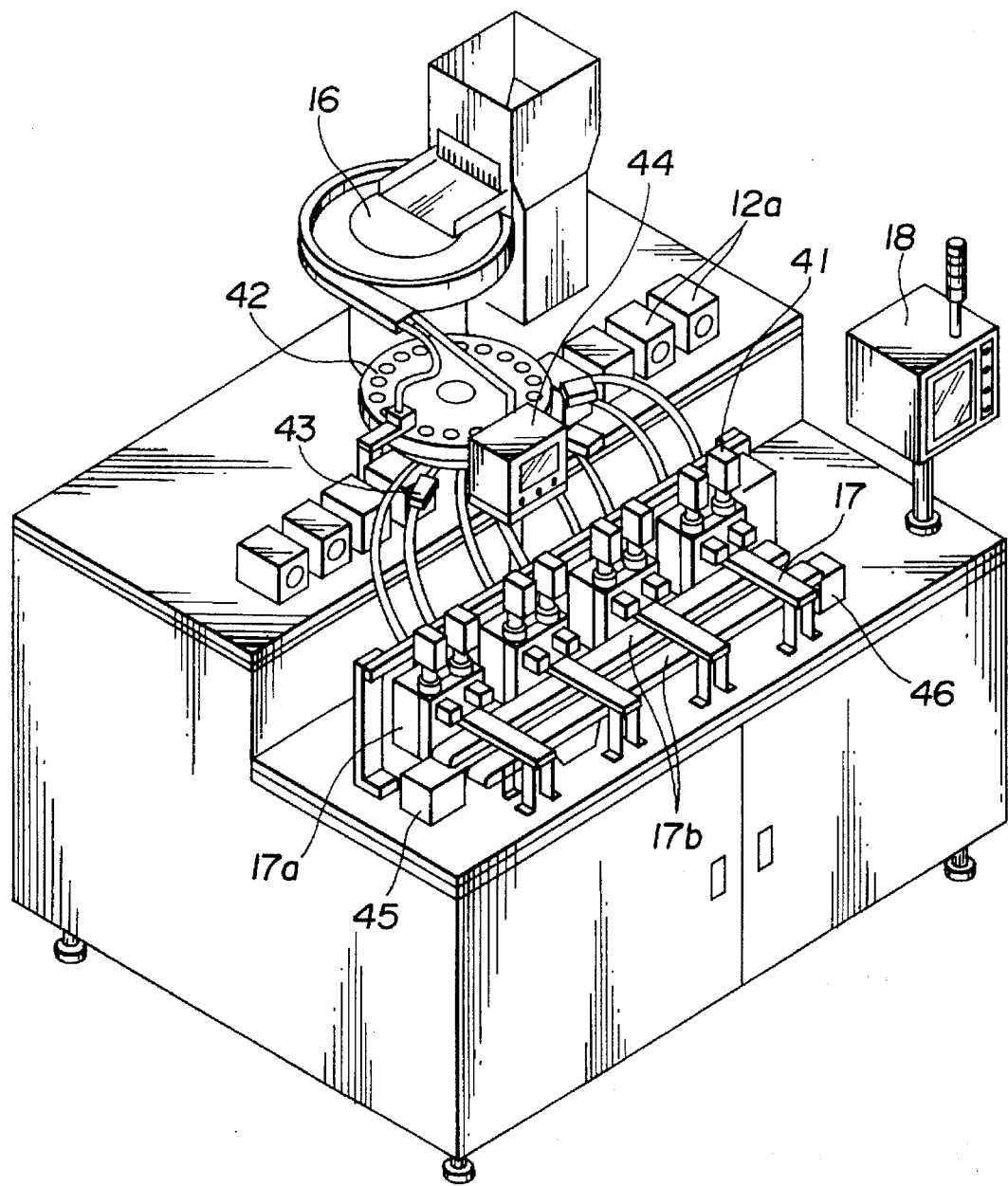
FIG. 26 is a perspective view showing the appearance of a glass fuse inspection system according to the present invention.

In addition, the glass tube fuse inspection system includes the halogen lamp 12a, ball feeder 16, sorter 17 and the operating panel 18, as shown in FIG. 26. The picture processor 14 and the sequencer 20 are arranged within the inside of a container housing.

The ball feeder 16 injects the glass tube fuses 1 into 10 to 12 holes of the index table 42. The shutter 43 separates the glass tube fuses 1 one by one from the index table 42 and supplies the separated glass tube fuses to the picture fetching sections 41.

Each picture fetching section 41 has the function of adjusting the mounting positions of the annular light 12 or the video camera 13 and transmits the picture information obtained on imaging the glass tube fuses 1 with the video camera 13 to the picture processor 14 for giving a decision as to acceptability of the inscriptions on the glass tube fuses 1.

The sorter 17 includes an escaper 17a for separating the good glass tube fuses 1 and the no-good glass tube fuses 1 from the picture fetching section 41, and a transporting conveyor 17b, as shown in FIG. 26. Thus the sorter transports the good glass tube fuses 1 and the no-good glass tube fuses 1 to recovery boxes 45 and 46, respectively, by way of completing automatic inspection of the glass tube fuses 1.

The glass tube fuse inspection system also inspects crevices cracks, fractures, contaminations by the fluxes of the glass tubes, bends in the elements, line breakages or admixture of the foreign matter, based upon the picture information obtained in imaging with the video camera 13. For example, the glass tube fuses 1 are illuminated by the annular light 12 from a position opposite to the video camera 13 for inspecting crevices of the glass tube or bends in the elements. In addition, the picture information produced by the video camera 13 is processed with graying for accentuating the boundary for detecting contamination with fluxes.

Figure 27:
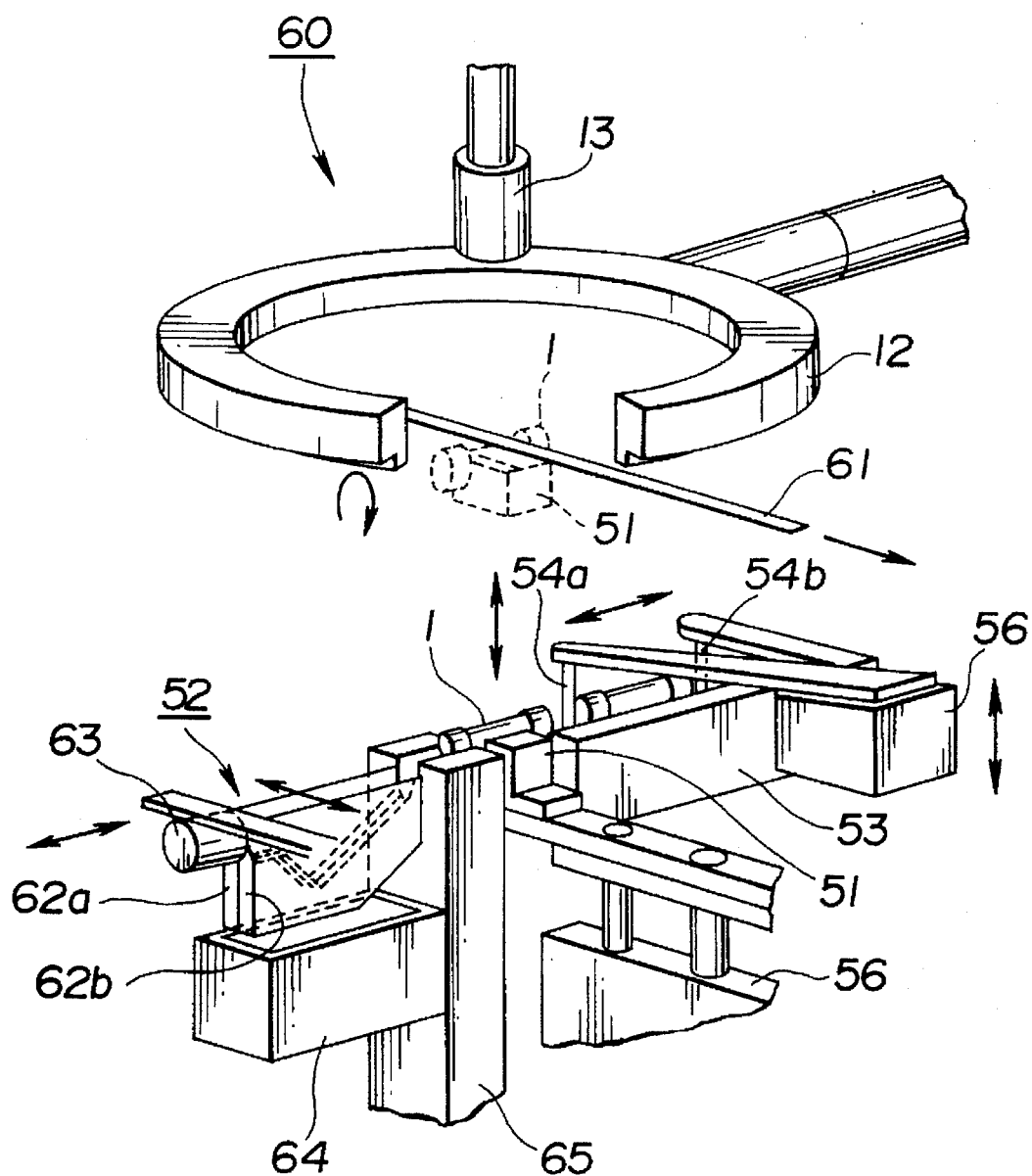
FIG. 27 is a perspective view showing essential parts of the glass fuse inspection system according to the present invention.

A modification of the glass tube fuse inspecting system according to the present invention is now explained. In FIG. 27, showing essential portions of the present modification, the parts or components which are the same as those of the above embodiment are denoted by the same numerals and the corresponding description is omitted for simplicity.

The glass tube fuse inspection system includes a picture fetching section 60 made up of the above-mentioned annular light 12, video camera 13 and so forth, a work setting jig 51 for holding the glass tube fuse 1 and moving it to the picture fetching section 60 and a work transporter 52 for receiving the inspected glass tube fuse 1 from the work setting jig 51 and sorting the glass tube fuse 1 based upon the results of decision on acceptability from the picture processor 14.

The glass tube fuses 1, supplied one by one from the index table 42, are supplied to an inserting rail 53. The inserting rail 53 includes work inserting pins 54a, 54b for pushing the glass tube fuses 1 supplied thereto into the work setting jig 51 and an inserting pin driving actuator 55 for vertically driving the work inserting pins 54a, 54b, as shown for example in FIG. 27. These work inserting pins 54a, 54b are spaced apart from each other by a distance equal to the length of the glass tube fuse 1 and are normally at a standby position (original position) overlying the inserting rail 53. When the glass tube fuse 1 is supplied to the inserting rail 53, the work inserting pins 54a, 54b are lowered by the inserting pin driving actuator 55 for clamping the glass tube fuse 1 in-between. The work inserting pins 54a, 54b are moved towards the work setting jig 51, that is in a forward direction, with the glass tube fuse 1 clamped in-between, by an actuator, not shown, for driving the work inserting pins 54a, 54b and the actuator 55 in unison and simultaneously along the inserting rail 53 in the fore-and-aft direction, for pushing the glass tube fuse 1 into the work setting jig 51.

That is, the work setting jig 51 has a groove on its top for holding the glass tube fuse 1. The rear side work inserting pin 54b thrusts the glass tube fuse 1 from the back side and transports the glass tube fuse 1 on the inserting rail 53 into engagement with the groove in the work setting jig 51. If the inspected glass tube fuse 1 is already held within the groove in the work setting jig 51, the forward work inserting pin 54a thrusts the glass tube fuse 1 out of the groove for ejection. The positioning of the glass tube fuse 1 held in the groove in the work setting jig 51 in the fore-and-aft direction is achieved by the fore-and-aft movement of the work inserting pins 54a, 54b. The work inserting pins 54a, 54b are subsequently lifted by the inserting pin driving actuator 55 and simultaneously returned to its original position and is at a standby position until the next glass tube fuse 1 is supplied to the inserting rail 53.

The work setting jig 51 is lifted, as it holds the glass tube fuse 1, by a setting jig driving actuator 56 adapted for vertically driving the work setting jig 51, for contacting the glass tube fuse 1 with a rotational driving belt 61 provided in the picture fetching section 60, as shown in FIG. 27.

The picture fetching section 60 includes, in addition to the annular light 12 and the video camera 13, an electric motor for driving the rotational driving belt 61, a tension roll for tensioning the belt 61 and so forth. The belt 61 affords the rotational force by its contacting portion for running the glass tube fuse 1 in rotation.

The picture fetching section 60 routes the picture information data obtained on imaging the glass tube fuse 1 with the video camera 13 at an interval of a pre-set angle of rotation to the picture processor 14 which then performs an inspection on acceptability of the glass tube fuse 1.

When the fetching of the picture information by the picture fetching section 60 comes to an end, the work setting jig 51 is lowered by the setting jig driving actuator 56 as it is holding the glass tube fuse 1. The glass tube fuse 1, already inspected and held by the work setting jig 51, is ejected by the work inserting pin 54a out of the setting jig 51 towards the work transporter 52 along a groove formed on the upper portion of a transport guide 65.

The work transporter 52 includes two doors 62a, 62b and a transporter opening and closing actuator 63 for opening and closing the doors 62a, 62b, as shown in FIG. 27. The transporter opening and closing actuator 63 opens and closes the doors 62a, 62b under control by the sequencer 20 based upon the results of decision on acceptability from the picture processor 14.

That is, the transporter opening and closing actuator 63 opens the doors 62a, 62b for the glass tube fuse 1 found to be no-good by the picture processor 14. As a result, the no-good glass tube fuse 1 (reject) supplied in the groove of the transport guide 65 is recovered in the reject recovery box 64. However, the transporter opening and closing actuator 63 closes the doors 62a, 62b for the glass tube fuse 1 found to be good by the picture processor 14, so that the work transporter 52 holds the good glass tube fuse 1 in a space defined between the doors 62a and 62b.

The work transporter 52 is moved by an actuator, not shown, in a direction away from the transport guide 65, as it holds the glass tube fuse 1 therein, as far as a good article recovery box, herein not shown. The doors 62a, 62b are then opened. As a result, the good glass tube fuse 1 is recovered in the good article recovery box.

In this manner, the inspection and selection between the good and no-good glass tube fuses 1 may be carried out automatically, thereby saving the labor. The glass tube fuses 1 found to be gray by the picture processor 14 may be recovered separately from the good and no-good articles.

The present invention is not limited to the inspection of the glass tube fuses and may also be applied to the inspection of characters or symbols printed on the curved surfaces of articles under inspection other than the glass tube fuses.

What is claimed is:

1. A method for inspecting a figure which is made up of characters or symbols and which are inscribed on a curved surface of an article, comprising:

rotating an article which is under inspection through a plurality of pre-set angular increments which produce a total rotation of more than 360°;

acquiring a picture fraction of the figure inscribed on said curved surface of the article under inspection for each of the angular increments;

synthesizing a full picture from data included in each of the acquired picture fractions, said synthesizing including discarding redundant picture fraction data resulting from an overlap caused by the rotation of the article through the plurality of angular increments which total more than 360°;

inspecting the figure inscribed on the curved surface of said article under inspection based on the synthesized picture information in a manner wherein the characters or symbols are sequentially recognized on a one-by-one basis using a predetermined character recognition technique;

comparing a character string made up of a series of recognized characters or symbols with a pre-set control character string during figure inspection; and sorting the article under inspection on the basis of the results of the inspecting step, into one of an acceptable group and an unacceptable group.

2. The method as claimed in claim 1 wherein the article under inspection is sorted based on the results of inspection of the figure.

3. The method as claimed in claim 1, wherein the article under inspection is rotated through (360°+a pre-set angle) and the plural picture fractions are synthesized into one full format picture in which one of the overlapping picture fractions is discarded.

4. The method as claimed in claim 3 wherein the figure is made up of characters or symbols, the characters or symbols are recognized one by one, and wherein a character string made up of the recognized characters or symbols is compared to a pre-set control character string by way of performing figure inspection.

5. An apparatus for inspecting a figure which is made up of characters or symbols and which is inscribed on an article having an curved surface, comprising:

means for rotating the article under inspection through a plurality of pre-set angular increments which produce a total rotation of more than 360°;

imaging means for imaging the figure inscribed on the curved surface of the article for each of the pre-set angular increments and for outputting picture information data;

means for synthesizing a full picture of the figure using the picture information data obtained from said imaging means, said synthesizing means discarding redundant data resulting from the overlap caused by the rotation of the article through the plurality of angular increments which total more than 360°; and inspecting means for inspecting the figure inscribed on the curved surface of the article based upon the picture information synthesized by said synthesizing means, said inspecting means including:

character recognition means for sequentially recognizing the characters or symbols on a one-by-one basis, and character string inspecting means for comparing a character string of characters or symbols recognized by said character recognition means with a pre-set control character string; and sorting means, responsive to said inspecting means for sorting the article under inspection into one of an acceptable group and an unacceptable group.

6. An apparatus for inspecting a figure that is made up of characters or symbols which are inscribed on a curved surface of an article, comprising:

means for rotating the article under inspection through a plurality of pre-set angular increments which produce a total rotation of more than 360°;

imaging means for imaging the figure inscribed on the curved surface of the article for each of the pre-set angular increments and for outputting picture information data for each angular increment;

means for synthesizing a full picture of the figure using the picture information data obtained from said imaging means and wherein redundant data resulting from an overlap caused by the rotation of the article through the plurality of angular increments which total more than 360° is discarded;

inspection means responsive to the full picture synthesizing means for outputting an output signal;

a setting jig for holding the article and rotating the article with respect to said imaging means; and sorting means which is adapted for receiving the article from said setting jig and for sorting the article based on the inspection output of said inspection means.

7. The apparatus as claimed in claim 6, wherein the article under inspection is rotated by said rotating means through (360°+a pre-set angle) and wherein the picture information data which is synthesized into one full format picture is such that the picture data for one overlapping angular increment is discarded.

8. The apparatus as claimed in claim 7, wherein said inspection means includes:

character recognition means for sequentially recognizing the characters or symbols on a one-by-one basis; and character string inspecting means for comparing a character string of characters or symbols recognized by said character recognition means with a pre-set control character string.

9. The apparatus as claimed in claim 8, further comprising an annular light for lighting the article under inspection while the article is being imaged by said imaging means.

* * * * *